(12) United States Patent
Miess et al.

(10) Patent No.: US 12,502,749 B2
(45) Date of Patent: *Dec. 23, 2025

(54) SUPERABRASIVE ELEMENTS AND RELATED METHODS FOR PROCESSING AND MANUFACTURING USING PROTECTIVE LAYERS

(71) Applicant: US Synthetic Corporation, Orem, UT (US)

(72) Inventors: David P. Miess, Highland, UT (US); Andrew E. Dadson, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 680 days.

This patent is subject to a terminal disclaimer.

(21) Appl. No.: 17/890,218

(22) Filed: Aug. 17, 2022

(65) Prior Publication Data

US 2022/0388121 A1 Dec. 8, 2022

Related U.S. Application Data

(60) Division of application No. 14/864,649, filed on Sep. 24, 2015, now Pat. No. 11,420,304, which is a
(Continued)

(51) Int. Cl.
*B24D 18/00* (2006.01)
*B24D 3/00* (2006.01)
(Continued)

(52) U.S. Cl.
CPC ......... *B24D 3/005* (2013.01); *B24D 18/0009* (2013.01); *B24D 18/0054* (2013.01);
(Continued)

(58) Field of Classification Search
CPC .......... B24D 3/005; B24D 18/0009; B24D 18/0054; B24D 99/005; F16C 33/043; F16C 33/26; F16C 17/02; F16C 17/04
(Continued)

(56) References Cited

U.S. PATENT DOCUMENTS 3,022,243 A 2/1962 Anderson
3,136,615 A 6/1964 Bovenkerk
(Continued)

FOREIGN PATENT DOCUMENTS

EP 0300699 A2 1/1989
EP 0329954 A2 8/1989
(Continued)

OTHER PUBLICATIONS

Nakamura, T. et al; Study on the Heat Deterioration Mechanism of Sintered Diamond; Program and Abstracts of the 27th High Pressure Conference of Japan; Oct. 13-15, 1986; Sapporo.
(Continued)

*Primary Examiner* — James E McDonough
(74) *Attorney, Agent, or Firm* — BKRIP LLC

(57) ABSTRACT

A method of processing a polycrystalline diamond element includes forming a protective layer over a selected portion of a polycrystalline diamond element, the polycrystalline diamond element having a polycrystalline diamond table that includes a superabrasive face, a superabrasive side surface, and a chamfer extending between the superabrasive face and the superabrasive side surface. A portion of the superabrasive side surface is covered by the protective layer and the protective layer is not formed over the chamfer. The method includes exposing at least a portion of the polycrystalline diamond element to a leaching solution. A polycrystalline diamond element has a polycrystalline diamond table that includes a leached volume extending from the superabrasive (Continued)

face to a portion of the chamfer proximate to the superabrasive side surface, and the leached volume does not substantially extend along the superabrasive side surface.

20 Claims, 19 Drawing Sheets

Related U.S. Application Data continuation of application No. 12/555,715, filed on Sep. 8, 2009, now Pat. No. 9,352,447.

(51) Int. Cl.
*B24D 99/00* (2010.01)
*F16C 33/04* (2006.01)
*F16C 33/26* (2006.01)
*F16C 17/02* (2006.01)
*F16C 17/04* (2006.01)

(52) U.S. Cl.
CPC .......... *B24D 99/005* (2013.01); *F16C 33/043* (2013.01); *F16C 33/26* (2013.01); *F16C 17/02* (2013.01); *F16C 17/04* (2013.01)

(58) Field of Classification Search
USPC .................................. 51/293, 295, 307, 309
See application file for complete search history.

(56) References Cited

U.S. PATENT DOCUMENTS

| | | |
|---|---|---|
| 3,141,746 A | 7/1964 | Lai |
| 3,233,988 A | 2/1966 | Wentorf, Jr. |
| 3,407,445 A | 10/1968 | Strong |
| 3,430,804 A | 3/1969 | Bernas |
| 3,745,623 A | 7/1973 | Wentorf |
| 3,785,093 A | 1/1974 | Vereschagin |
| 3,850,591 A | 11/1974 | Wentorf |
| 4,108,614 A | 8/1978 | Mitchell |
| 4,151,686 A | 5/1979 | Lee |
| 4,224,380 A | 9/1980 | Bovenkerk |
| 4,255,165 A | 3/1981 | Dennis |
| 4,268,276 A | 5/1981 | Bovenkerk |
| 4,288,248 A | 9/1981 | Bovenkerk |
| 4,303,442 A | 12/1981 | Hara |
| 4,311,490 A | 1/1982 | Bovenkerk |
| 4,373,593 A | 2/1983 | Phaal |
| 4,387,287 A | 6/1983 | Marazzi |
| 4,412,980 A | 11/1983 | Tsuji |
| 4,481,016 A | 11/1984 | Campbell |
| 4,486,286 A | 12/1984 | Lewin |
| 4,504,519 A | 3/1985 | Zelez |
| 4,522,633 A | 6/1985 | Dyer |
| 4,525,179 A | 6/1985 | Gigl |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall |
| 4,621,031 A | 11/1986 | Scruggs |
| 4,636,253 A | 1/1987 | Nakai |
| 4,643,741 A | 2/1987 | Yu |
| 4,645,977 A | 2/1987 | Kurokawa |
| 4,662,348 A | 5/1987 | Hall |
| 4,664,705 A | 5/1987 | Horton |
| 4,670,025 A | 6/1987 | Pipkin |
| 4,707,384 A | 11/1987 | Schachner |
| 4,726,718 A | 2/1988 | Meskin |
| 4,731,296 A | 3/1988 | Kikuchi |
| 4,766,040 A | 8/1988 | Hillert |
| 4,776,861 A | 10/1988 | Frushour |
| 4,784,023 A | 11/1988 | Dennis |
| 4,792,001 A | 12/1988 | Zijsling |
| 4,797,241 A | 1/1989 | Peterson |
| 4,802,539 A | 2/1989 | Hall |
| 4,807,402 A | 2/1989 | Rai |
| 4,844,185 A | 7/1989 | Newton, Jr |
| 4,854,405 A | 8/1989 | Stroud |
| 4,861,350 A | 8/1989 | Phaal |
| 4,871,377 A | 10/1989 | Frushour |
| 4,899,922 A | 2/1990 | Slutz |
| 4,919,220 A | 4/1990 | Fuller |
| 4,940,180 A | 7/1990 | Martell |
| 4,943,488 A | 7/1990 | Sung |
| 4,944,772 A | 7/1990 | Cho |
| 5,011,514 A | 4/1991 | Cho |
| 5,027,912 A | 7/1991 | Juergens |
| 5,092,687 A | 3/1992 | Hall |
| 5,127,923 A | 7/1992 | Bunting |
| 5,135,061 A | 8/1992 | Newton, Jr. |
| 5,176,720 A | 1/1993 | Martell |
| 5,186,725 A | 2/1993 | Martell |
| 5,213,248 A | 5/1993 | Horton |
| 5,238,074 A | 8/1993 | Tibbitts |
| 5,264,283 A | 11/1993 | Waldenstrom |
| 5,337,844 A | 8/1994 | Tibbitts |
| 5,355,969 A | 10/1994 | Hardy |
| 5,379,853 A | 1/1995 | Lockwood |
| 5,464,068 A | 11/1995 | Najafi-Sani |
| 5,468,268 A | 11/1995 | Tank |
| 5,496,638 A | 3/1996 | Waldenstrom |
| 5,505,748 A | 4/1996 | Tank |
| 5,510,193 A | 4/1996 | Cerutti |
| 5,523,121 A | 6/1996 | Anthony |
| 5,607,024 A | 3/1997 | Keith |
| 5,620,382 A | 4/1997 | Cho |
| 5,624,068 A | 4/1997 | Waldenstrom |
| 5,645,617 A | 7/1997 | Frushour |
| 5,697,994 A | 12/1997 | Packer |
| 5,718,948 A | 2/1998 | Ederyd |
| 5,722,499 A | 3/1998 | Nguyen |
| 5,759,216 A | 6/1998 | Kanada |
| 5,776,615 A | 7/1998 | Wong |
| 5,833,021 A | 11/1998 | Mensa-Wilmot |
| 5,848,348 A | 12/1998 | Dennis |
| 5,875,862 A | 3/1999 | Jurewicz |
| 5,897,942 A | 4/1999 | Karner |
| 5,935,066 A | 8/1999 | Harris |
| 5,954,147 A | 9/1999 | Overstreet |
| 5,979,578 A | 11/1999 | Packer |
| 6,009,963 A | 1/2000 | Chaves |
| 6,063,333 A | 5/2000 | Dennis |
| 6,123,612 A | 9/2000 | Goers |
| 6,126,741 A | 10/2000 | Jones |
| 6,167,740 B1 | 1/2001 | Lipari |
| 6,193,001 B1 | 2/2001 | Eyre |
| 6,234,261 B1 | 5/2001 | Evans |
| 6,248,447 B1 | 6/2001 | Griffin |
| 6,258,139 B1 | 7/2001 | Jensen |
| 6,269,894 B1 | 8/2001 | Griffin |
| 6,290,726 B1 | 9/2001 | Pope |
| 6,315,065 B1 | 11/2001 | Yong |
| 6,344,149 B1 | 2/2002 | Oles |
| 6,367,568 B2 | 4/2002 | Steinke |
| 6,398,815 B1 | 6/2002 | Pope |
| 6,410,085 B1 | 6/2002 | Griffin |
| 6,435,058 B1 | 8/2002 | Matthias |
| 6,447,560 B2 | 9/2002 | Jensen |
| 6,528,159 B1 | 3/2003 | Kanada |
| 6,541,115 B2 | 4/2003 | Pender |
| 6,544,308 B2 | 4/2003 | Griffin |
| 6,562,462 B2 | 5/2003 | Griffin |
| 6,585,064 B2 | 7/2003 | Griffin |
| 6,589,640 B2 | 7/2003 | Griffin |
| 6,592,985 B2 | 7/2003 | Griffin |
| 6,601,662 B2 | 8/2003 | Matthias |
| 6,726,823 B1 | 4/2004 | Wang |
| 6,739,214 B2 | 5/2004 | Griffin |
| 6,749,033 B2 | 6/2004 | Griffin |
| 6,797,326 B2 | 9/2004 | Griffin |
| 6,861,098 B2 | 3/2005 | Griffin |
| 6,861,137 B2 | 3/2005 | Griffin |
| 6,878,447 B2 | 4/2005 | Griffin |
| 6,892,836 B1 | 5/2005 | Eyre |

(56) References Cited

U.S. PATENT DOCUMENTS

| | | |
|---|---|---|
| 6,904,984 B1 | 6/2005 | Estes |
| 6,935,444 B2 | 8/2005 | Lund |
| 6,962,214 B2 | 11/2005 | Hughes |
| 7,350,601 B2 | 4/2008 | Belnap |
| 7,377,341 B2 | 5/2008 | Middlemiss |
| 7,488,537 B2 | 2/2009 | Radtke |
| 7,506,698 B2 | 3/2009 | Eyre |
| 7,517,589 B2 | 4/2009 | Eyre |
| 7,568,534 B2 | 8/2009 | Griffin |
| 7,608,333 B2 | 10/2009 | Eyre |
| 7,712,553 B2 | 5/2010 | Shamburger |
| 7,754,333 B2 | 7/2010 | Eyre |
| 8,147,572 B2 | 4/2012 | Eyre |
| 9,352,447 B2 * | 5/2016 | Miess ................ F16C 33/26 |
| 10,011,996 B1 | 7/2018 | Sauerwein |
| 10,031,989 B2 | 7/2018 | Alfano |
| 10,081,986 B2 | 9/2018 | Stewart |
| 10,111,988 B2 | 10/2018 | Dosta |
| 10,181,994 B2 | 1/2019 | Stokking |
| 10,202,005 B2 | 2/2019 | Shimizu |
| 10,251,984 B2 | 4/2019 | Mohl |
| 10,272,005 B2 | 4/2019 | Schem |
| 10,291,968 B2 | 5/2019 | Gaste |
| 10,311,996 B2 | 6/2019 | Sharma |
| 11,011,983 B2 | 5/2021 | Chesneau |
| 11,041,986 B2 | 6/2021 | Li |
| 11,061,984 B2 | 7/2021 | Laventman |
| 11,071,995 B2 | 7/2021 | Pressey |
| 11,082,001 B2 | 8/2021 | Gross |
| 11,082,005 B2 | 8/2021 | Nguyen |
| 11,091,999 B2 | 8/2021 | Zhang |
| 11,101,998 B2 | 8/2021 | Ono |
| 11,132,001 B2 | 9/2021 | Reuter |
| 11,151,988 B1 | 10/2021 | Yavagal |
| 11,171,987 B2 | 11/2021 | Guri |
| 11,191,993 B1 | 12/2021 | Chen |
| 11,192,002 B2 | 12/2021 | Binder |
| 11,211,995 B2 | 12/2021 | Takano |
| 11,231,993 B2 | 1/2022 | Qin |
| 11,242,011 B2 | 2/2022 | Cho |
| 11,251,993 B2 | 2/2022 | Sasaki |
| 11,261,974 B2 | 3/2022 | Wei |
| 2001/0037609 A1 | 11/2001 | Jensen |
| 2005/0044800 A1 | 3/2005 | Hall |
| 2005/0115744 A1 | 6/2005 | Griffin |
| 2005/0129950 A1 | 6/2005 | Griffin |
| 2005/0139397 A1 | 6/2005 | Achilles |
| 2005/0214184 A1 | 9/2005 | Chambers |
| 2005/0230156 A1 | 10/2005 | Belnap |
| 2006/0060390 A1 | 3/2006 | Eyre |
| 2006/0060391 A1 | 3/2006 | Eyre |
| 2006/0086540 A1 | 4/2006 | Griffin |
| 2006/0162969 A1 | 7/2006 | Belnap |
| 2007/0039762 A1 | 2/2007 | Achilles |
| 2007/0046120 A1 | 3/2007 | Cooley |
| 2007/0169419 A1 | 7/2007 | Davis |
| 2007/0181348 A1 | 8/2007 | Lancaster |
| 2007/0187155 A1 | 8/2007 | Middlemiss |
| 2008/0028839 A1 | 2/2008 | Vail |
| 2008/0085407 A1 | 4/2008 | Cooley |
| 2008/0142272 A1 | 6/2008 | Hall |
| 2008/0210066 A1 | 9/2008 | Arterburn |
| 2009/0152016 A1 | 6/2009 | Eyre |
| 2010/0011673 A1 | 1/2010 | Shamburger |
| 2010/0294571 A1 | 11/2010 | Belnap |
| 2011/0023375 A1 | 2/2011 | Sani |
| 2011/0042148 A1 | 2/2011 | Schmitz |
| 2011/0284294 A1 | 11/2011 | Cox |

FOREIGN PATENT DOCUMENTS

| | | |
|---|---|---|
| EP | 0196777 B1 | 3/1991 |
| EP | 0585631 A1 | 3/1994 |
| EP | 0617207 A2 | 9/1994 |
| EP | 0500253 B1 | 11/1997 |
| EP | 0595630 B1 | 1/1998 |
| EP | 0612868 B1 | 7/1998 |
| EP | 0860515 A1 | 8/1998 |
| EP | 0787820 A3 | 7/2000 |
| EP | 1190791 B1 | 6/2010 |
| GB | 1349385 A | 4/1974 |
| GB | 2048927 A | 12/1980 |
| GB | 2268768 B | 1/1996 |
| GB | 2323398 B | 6/2001 |
| GB | 2451951 | 2/2009 |
| GB | 2422394 B | 4/2010 |
| GB | 2418215 B | 7/2010 |
| JP | 59-35066 | 2/1984 |
| JP | 61-67740 | 10/1984 |
| JP | 59-219500 | 12/1984 |
| JP | 61-125739 | 6/1986 |
| JP | 63069971 | 9/1986 |
| JP | 6355161 B2 | 8/1987 |
| JP | 07156003 | 11/1993 |
| JP | 07-62468 | 3/1995 |
| JP | 11245103 | 9/1999 |
| JP | 2000087112 A | 3/2000 |
| RU | 2034937 C1 | 5/1995 |
| RU | 566439 | 7/2000 |
| WO | 93/23204 A1 | 11/1993 |
| WO | 96/34131 A1 | 10/1996 |
| WO | 00/28106 A1 | 5/2000 |
| WO | 04/040095 | 5/2004 |
| WO | 2004106003 A1 | 12/2004 |
| WO | 2004106004 A1 | 12/2004 |

OTHER PUBLICATIONS

Hong, S. et al.; Dissolution Behavior of Fine Prticles of Diamond Under High Pressure Sintering Conditions; Jornal of Materials Science Letters 10; pp. 164-166; 1991.

* cited by examiner

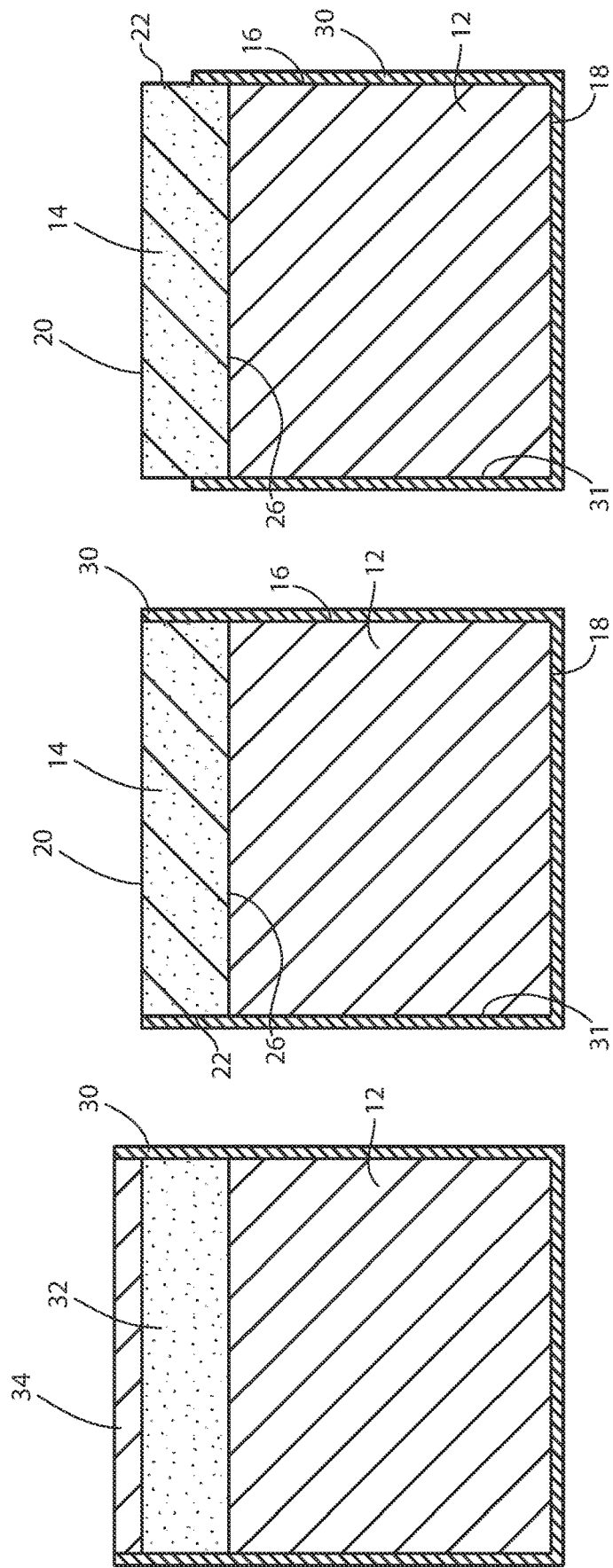

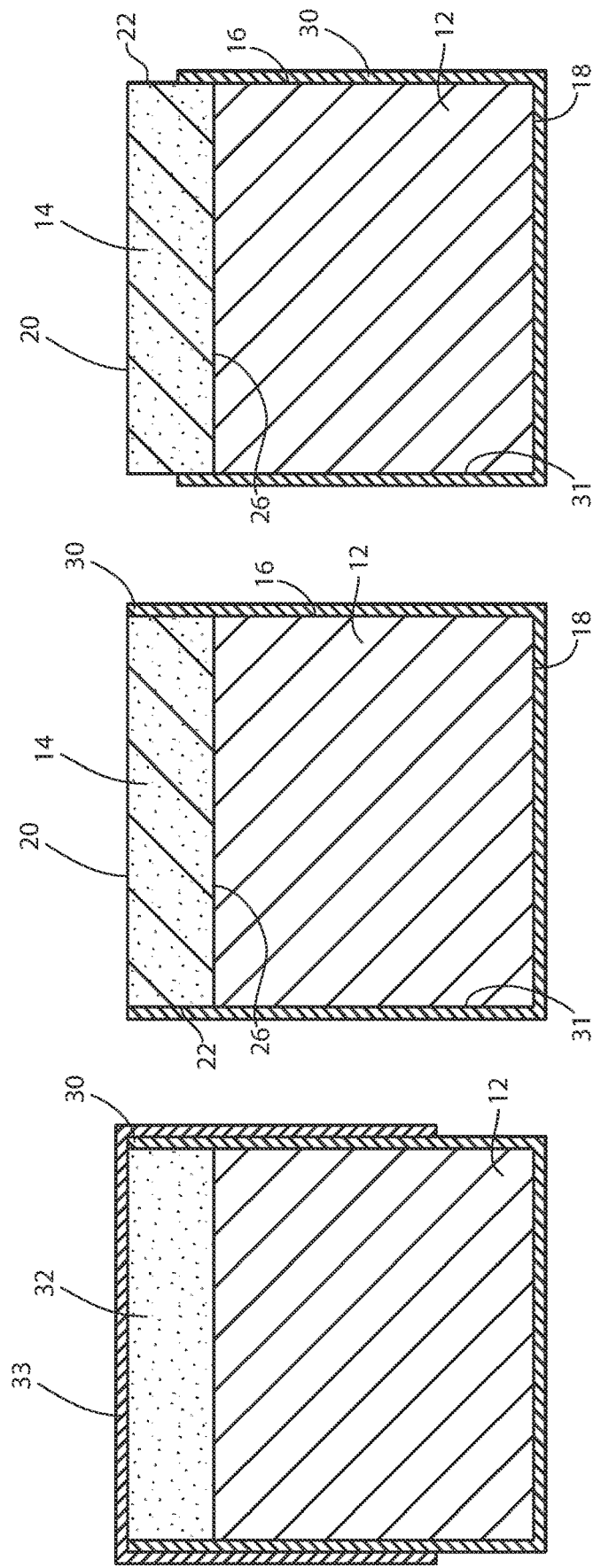

SUPERABRASIVE ELEMENTS AND RELATED METHODS FOR PROCESSING AND MANUFACTURING USING PROTECTIVE LAYERS

CROSS REFERENCE TO RELATED APPLICATIONS

This application is a divisional of U.S. patent application Ser. No. 14/864,649, titled "Superabrasive Elements and Methods for Processing and Manufacturing the Same Using Protective Layers," filed 24 Sep. 2015, which application is a continuation of U.S. patent application Ser. No. 12/555,715, titled "Superabrasive Elements and Methods for Processing and Manufacturing the Same Using Protective Layers," filed 8 Sep. 2009, the disclosure of each of which is hereby incorporated, in its entirety, by this reference.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Other types of superabrasive materials, such as ceramics (e.g., cubic boron nitride, silicon carbide, and the like), may also be utilized for similar applications.

Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

Conventional superabrasive materials have also found utility as bearing elements in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

Conventional chemical leaching techniques often involve the use of highly concentrated and corrosive solutions, such as highly acidic solutions, to dissolve and remove metal-solvent catalysts from polycrystalline diamond materials. However, in addition to dissolving metal-solvent catalysts from a PCD material, leaching solutions may also dissolve portions of a substrate to which the PCD material is attached. For example, highly acidic leaching solutions may dissolve portions of a cobalt-cemented tungsten carbide substrate, causing undesired pitting and/or other corrosion of the substrate surface.

In some conventional leaching techniques, a polymeric shielding cup may be placed around a portion of a PCD element to protect the substrate from a leaching solution. However, a leaching solution may occasionally pass through spaces existing between the shielding cup and the PCD element, particularly when the PCD element is immersed in the leaching solution for extended periods of time and/or when the PCD element is subjected to changing temperatures and/or pressures.

Accordingly, conventional shielding cups may only provide PCD articles with limited protection from leaching solutions, and such shielding cups may not provide adequate protection under various leaching conditions that are required in order to leach interstitial materials from the PCD articles to a desired degree. For example, in order to leach PCD articles to certain leach specifications, the PCD articles may be exposed to leaching solutions for extended periods of time and/or the PCD articles may be exposed to the leaching solutions under various temperature and/or pressure conditions. Additionally, conventional shielding cups may not provide adequate protection to PCD articles having non-cylindrical shapes.

While various temperatures, pressures, and/or leach times may enable leaching of a PCD article to a greater degree, such conditions may undesirably cause passage of a leaching solution between the PCD article and a shielding cup surrounding the PCD article, increasing contact between the leaching solution and a substrate or other protected part of the PCD article. Various temperatures, pressures, and/or leach times may also accelerate the rate at which the leaching solutions attack substrate materials, such as carbide materials, resulting in excessive corrosion and/or damage to the substrates.

SUMMARY

The instant disclosure is directed to exemplary methods of processing polycrystalline diamond elements. In some examples, a method of processing polycrystalline diamond elements may comprise forming a protective layer over only a selected portion of a polycrystalline diamond element. The polycrystalline diamond element may comprise a polycrystalline diamond table. The method may also comprise exposing at least a portion of the polycrystalline diamond element to a leaching solution such that the leaching solution contacts an exposed surface region of the polycrystalline diamond table and at least a portion of the protective layer.

In some embodiments, the polycrystalline diamond element may also comprise a substrate bonded to the polycrystalline diamond table. The selected portion may comprise at least a portion of a surface of the polycrystalline diamond table and/or at least a portion of a surface of the substrate. In some embodiments, an outer layer may be formed on at least a portion of an outer surface of the protective layer.

The protective layer may be substantially impermeable to the leaching solution. In some examples, the protective layer may comprise a substantially inert material. In various embodiments, the protective layer may comprise one or more of metal, polymer, glass, carbon, and/or ceramic materials. In at least one example, the protective layer may comprise a metallic material including at least one of a refractory metal, a precious metal, a steel alloy, and/or a steel derivative alloy. In various examples, the protective layer may comprise a thermoplastic material. In at least one example, the protective layer may comprise graphite and/or a glass sealant. In various examples, the protective layer may comprise a thermosetting material, which may be formed over the selected portion of the polycrystalline diamond element by curing the thermosetting material (e.g., by applying heat, pressure, UV radiation, etc.).

In various embodiments, forming the protective layer over only a selected portion of the polycrystalline diamond element may comprise forming an intercalated hybrid layer at an interface between the protective layer and the polycrystalline diamond element. The intercalated hybrid layer may comprise portions of the protective layer disposed between portions of the polycrystalline diamond element. In at least one embodiment, the intercalated hybrid layer may comprise portions of the protective layer disposed within cavities defined in the polycrystalline diamond element.

According to at least one embodiment, the protective layer may be formed over the selected portion of the polycrystalline diamond element by exposing the protective layer to an elevated temperature and an elevated pressure. The elevated temperature may comprise a temperature of about 50° C. or higher and the elevated pressure may comprise a pressure of about 1000 psi or higher.

In at least one embodiment, the method may comprise chamfering an edge portion of the polycrystalline diamond table. Chamfering the edge portion of the polycrystalline diamond table may comprise making a reference mark on a portion of the polycrystalline diamond element and grinding the edge portion of the polycrystalline table with a centerless grinder, utilizing the reference mark to locate the edge portion. In various embodiments, at least a portion of the protective layer may be removed from the selected portion of the polycrystalline diamond element (e.g., by lapping, grinding, etc.).

According to some embodiments, a method of processing a polycrystalline diamond element may comprise forming a protective layer and an intermediate layer on a selected portion of a polycrystalline diamond element. In at least one example, forming the protective layer and the intermediate layer on the selected portion of the polycrystalline diamond element may comprise affixing the intermediate layer to the selected portion of the polycrystalline diamond element and affixing the protective layer to the intermediate layer.

In some embodiments, a method of processing a polycrystalline diamond element may comprise surrounding at least a portion of a polycrystalline diamond element with a protective heat-shrink layer, the polycrystalline diamond element comprising a polycrystalline diamond table. The method may also comprise exposing the protective heat-shrink material to a temperature at which the heat-shrink material contracts against a selected portion of the polycrystalline diamond element.

Exemplary methods of manufacturing polycrystalline diamond elements are also disclosed. According to at least one embodiment, a method of manufacturing a polycrystalline diamond element may comprise forming a protective layer over only a selected portion of a polycrystalline diamond element during sintering of a polycrystalline diamond table of the polycrystalline diamond element such that an intercalated hybrid layer is formed between the protective layer and the polycrystalline diamond element. The method may also comprise exposing at least a portion of the polycrystalline diamond element to a leaching solution such that the leaching solution contacts an exposed surface region of the polycrystalline diamond table and at least a portion of the protective layer. The protective layer may be substantially impermeable to the leaching solution.

According to at least one example, forming the polycrystalline diamond element and the protective layer formed over the selected portion of the polycrystalline diamond element may comprise disposing a particulate mixture comprising diamond particles adjacent to the protective layer and sintering the particulate mixture to form the polycrystalline diamond table such that the protective layer is formed over at least a portion of a surface of the polycrystalline diamond table.

According to various embodiments, forming the polycrystalline diamond element and the protective layer formed over the selected portion of the polycrystalline diamond element may further comprise disposing the particulate mixture comprising diamond particles adjacent to a substrate. The selected portion of the polycrystalline diamond element may comprise at least a portion of a surface of the substrate. In at least one example, forming the polycrystalline diamond element and the protective layer over the selected portion of the polycrystalline diamond element may also comprise partially removing a portion of the protective layer from a portion of a surface of the polycrystalline diamond table.

Features from any of the described embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6A is a cross-sectional side view of an exemplary sintering configuration including a substrate and a particulate mixture disposed in a sintering container prior to sintering according to at least one embodiment.

FIG. 6B is a cross-sectional side view of the sintering configuration illustrated in FIG. 6A following sintering.

FIG. 6C is a cross-sectional side view of the sintering configuration illustrated in FIG. 6B after a portion of the sintering container has been removed.

FIG. 11A is a cross-sectional side view of an exemplary sintering configuration including a substrate and a particulate mixture disposed in a sintering container prior to sintering according to at least one embodiment.

FIG. 11B is a cross-sectional side view of the sintering configuration illustrated in FIG. 11A following sintering and leaching.

FIG. 11C is a cross-sectional side view of the sintering configuration illustrated in FIG. 11B after a portion of the sintering container has been removed.

Figure 1:
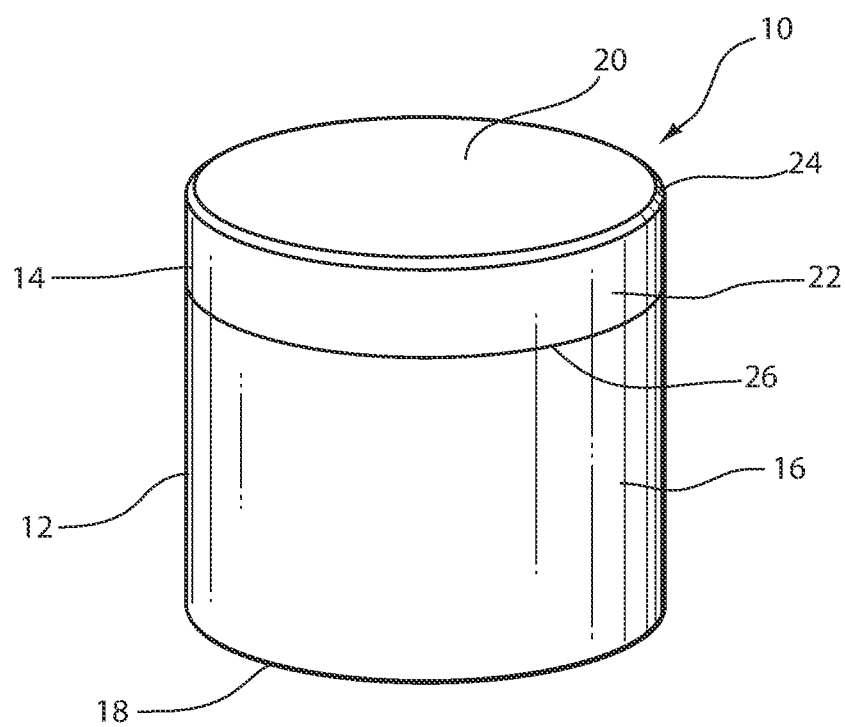
FIG. 1 is a perspective view of an exemplary superabrasive element including a substrate and a superabrasive table according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to superabrasive cutting elements and drill bits used in drilling and/or other cutting operations. The cutting elements may be optimized for cutting selected formations. The optimized cutting elements may also have optimal strength and thermal stability characteristics suited to selected formation types. The cutting elements disclosed herein may be used in a variety of applications, such as drilling tools, machining equipment, cutting tools, and other apparatuses, without limitation. The instant disclosure is also directed to methods for manufacturing superabrasive cutting elements optimized for cutting selected formations.

As used herein, the terms "superabrasive" and "superhard" may refer to materials exhibiting a hardness exceeding a hardness of tungsten carbide. For example, a superabrasive article may represent an article of manufacture, at least a portion of which may exhibit a hardness exceeding the hardness of tungsten carbide. As used herein, the term "cutting" may refer broadly to machining processes, drilling processes, boring processes, and/or any other material removal process utilizing a cutting element.

FIG. 1 is a perspective view of an exemplary superabrasive element 10 according to at least one embodiment. As illustrated in FIG. 1, superabrasive element 10 may comprise a superabrasive table 14 affixed to or formed upon a substrate 12. Superabrasive table 14 may be affixed to substrate 12 at interface 26. Superabrasive element 10 may comprise a rear face 18 and a substrate side surface 16 formed by substrate 12. Superabrasive element 10 may also comprise a superabrasive face 20, a superabrasive side surface 22, and a superabrasive edge 24 formed by superabrasive table 14. Superabrasive edge 24 may comprise an angular and/or rounded edge formed at the intersection of superabrasive side surface 22 and superabrasive face 20. In various embodiments, superabrasive edge 24 may comprise a chamfered surface or other selected geometry (e.g., one or more radius and/or one or more chamfer, etc.) extending between superabrasive side surface 22 and superabrasive face 20. In some embodiments, superabrasive edge 24 may act as a cutting edge during drilling and/or cutting operations.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. Further, substrate 12 may include a suitable metal-solvent catalyst material, such as, for example, cobalt, nickel, iron, and/or alloys thereof. Substrate 12 may also include any other suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof.

Superabrasive table 14 may be formed of any suitable superabrasive and/or superhard material or combination of materials, including, for example PCD. According to additional embodiments, superabrasive table 14 may comprise cubic boron nitride, silicon carbide, diamond, and/or mixtures or composites including one or more of the foregoing materials.

Superabrasive table 14 may be formed using any suitable technique. For example, superabrasive table 14 may comprise a PCD layer formed by subjecting a plurality of diamond particles (e.g., diamond particles having an average particle size between approximately 0.5 µm and approximately 150 µm) to a HPHT sintering process in the presence of a metal-solvent catalyst, such as cobalt, nickel, iron, and/or any other suitable group VIII element or alloys thereof. During a HPHT sintering process, adjacent diamond crystals in a mass of diamond particles may become bonded to one another, forming a PCD table comprising bonded diamond crystals. In at least one example, bonded diamond crystals in superabrasive table 14 may have an average grain size of approximately 20 µm or less. Further, during a HPHT sintering process, diamond grains may become bonded to an adjacent substrate 12 at interface 26.

According to various embodiments, superabrasive table 14 may be formed by placing diamond particles adjacent to a substrate 12 comprising cobalt-cemented tungsten carbide. The resulting sintered PCD layer may include various interstitial materials, including, for example, cobalt, tungsten, and/or tungsten carbide. In some examples, material components of substrate 12 may migrate into a mass of diamond particles used to form superabrasive table 14 during HPHT sintering.

According to at least one embodiment, as the mass of diamond particles is sintered, a metal-solvent catalyst may melt and flow from substrate 12 into the mass of diamond particles. As the metal-solvent flows into superabrasive table 14, it may also dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer. Additionally, as the PCD layer is cooled, the metal-solvent may solidify and adhere to diamond grains in the PCD layer, thereby holding the PCD layer in a compressed state.

Figure 2:
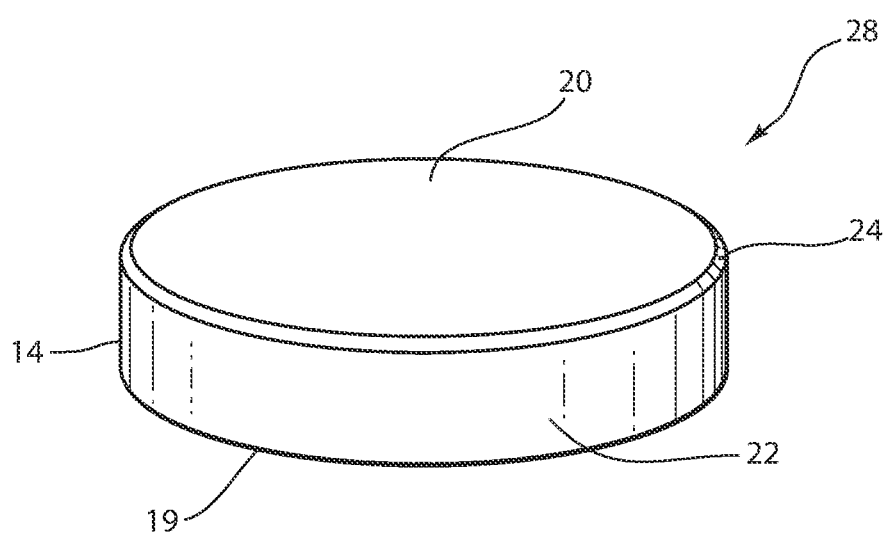
FIG. 2 is a perspective view of an exemplary superabrasive disc comprising a superabrasive table according to various embodiments.

FIG. 2 is a perspective view of an exemplary superabrasive disc 28 according to at least one embodiment. As illustrated in FIG. 2, superabrasive disc 28 may comprise a superabrasive table 14 that is not attached to a substrate.

Superabrasive disc 28 may be formed using any suitable technique, including, for example, HPHT sintering, as described above. In some examples, superabrasive disc 28 may be manufactured by first forming a superabrasive element comprising a superabrasive layer bonded to a substrate (e.g., superabrasive element 10 illustrated in FIG. 1). Superabrasive table 14 may be separated from substrate 12 to form superabrasive disc 28. Superabrasive table 14 may be separated from substrate 12 using a lapping process, a grinding process, a wire-electrical-discharge machining ("wire EDM") process, or any other suitable material-removal process, without limitation. Superabrasive disc 28 may comprise a rear face 19 that is formed by superabrasive table 14.

Figure 3:
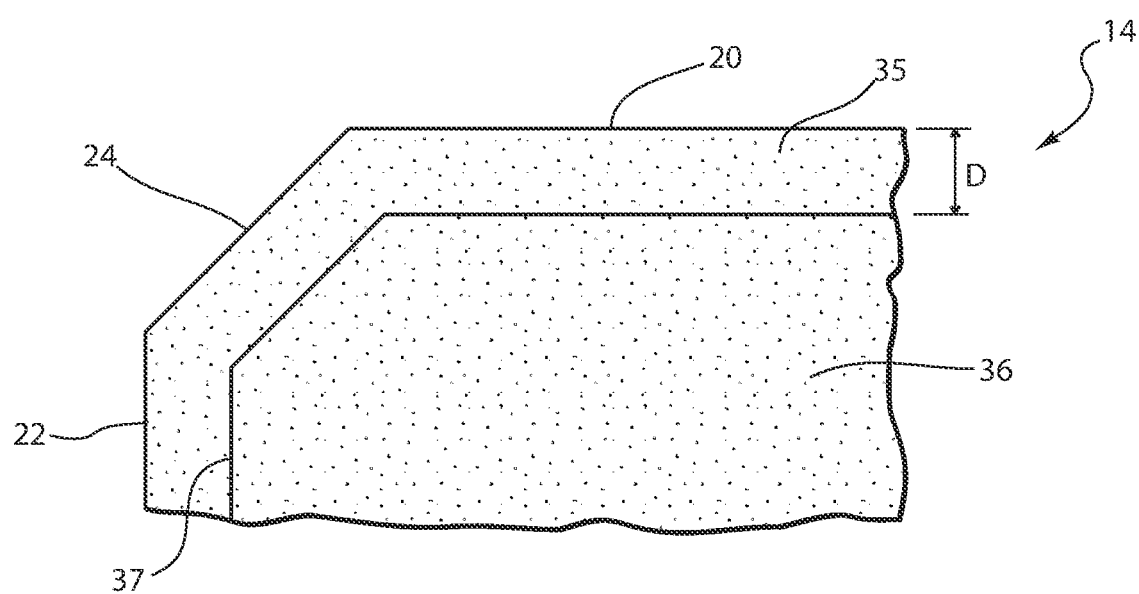
FIG. 3 is a cross-sectional side view of a portion of a superabrasive table that is at least partially leached according to at least one embodiment.

FIG. 3 is a cross-sectional side view of a portion of an exemplary superabrasive table 14, such as exemplary superabrasive tables 14 illustrated in FIGS. 1 and 2. Superabrasive table 14 may comprise a composite superhard material, such as a PCD material. A PCD material may include a matrix of bonded diamond grains and interstitial regions defined between the bonded diamond grains. Such interstitial regions may be at least partially filled with various materials. In some embodiments, a metal-solvent catalyst may be disposed in interstitial regions in superabrasive table 14. Tungsten, tungsten carbide, and/or other materials may also be present in the interstitial regions.

Following sintering, various materials, such as a metal-solvent catalyst, remaining in interstitial regions within superabrasive table 14 may reduce the thermal stability of superabrasive table 14 at elevated temperatures. In some examples, differences in thermal expansion coefficients between diamond grains in superabrasive table 14 and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from superabrasive table 14 may improve the heat resistance and/or thermal stability of superabrasive table 14, particularly in situations where the PCD material may be exposed to elevated temperatures. The metal-solvent catalyst and/or other materials may be removed from superabrasive table 14 using any suitable technique, including, for example, leaching. In at least one embodiment, a metal-solvent catalyst, such as cobalt, may be removed from regions of superabrasive table 14 that may experience elevated temperatures, such as regions adjacent to the working surfaces of superabrasive table 14. Removing a metal-solvent catalyst from superabrasive table 14 may prevent damage to the PCD material caused by expansion of the metal-solvent catalyst.

At least a portion of a metal-solvent catalyst, such as cobalt, as well as other materials, may be removed from at least a portion of superabrasive table 14 using any suitable technique, without limitation. For example, chemical and/or gaseous leaching may be used to remove a metal-solvent catalyst from superabrasive table 14 up to a depth D from a surface of superabrasive table 14, as illustrated in FIG. 3. As shown in FIG. 3, depth D may be measured relative to an external surface of superabrasive table 14, such as superabrasive face 20, superabrasive side surface 22, and/or superabrasive edge 24. Any suitable leaching solution and/or gas mixture may be used to leach materials from superabrasive table 14, without limitation. In some embodiments, only portions of one or more surfaces of superabrasive table 14 may be leached, leaving remaining portions of the surfaces unleached. Other suitable techniques may be used for removing a metal-solvent catalyst and/or other materials from superabrasive table 14 or may be used to accelerate a chemical leaching process. For example, exposing the superabrasive material to electric current, microwave radiation, and/or ultrasound may be employed to leach or to accelerate a chemical leaching process, without limitation.

Following leaching, superabrasive table 14 may comprise a first volume 35 that is substantially free of a metal-solvent catalyst, as shown in FIG. 3. However, small amounts of metal-solvent catalyst may remain within interstices that are inaccessible to the leaching process. First volume 35 may extend from one or more surfaces of superabrasive table 14 (e.g., superabrasive face 20, superabrasive side surface 22, and/or superabrasive edge 24) to a depth D from the one or more surfaces. First volume 35 may be located adjacent one or more surfaces of superabrasive table 14.

Following leaching, superabrasive table 14 may also comprise a second volume 36 that contains a metal-solvent catalyst, as shown in FIG. 3. An amount of metal-solvent catalyst in second volume 36 may be substantially the same prior to and following leaching. In various embodiments, second volume 36 may be remote from one or more exposed surfaces of superabrasive table 14. In various embodiments, an amount of metal-solvent catalyst in first volume 35 and/or second volume 36 may vary at different depths in superabrasive table 14. Superabrasive table 14 may also include a transition region 37 (depicted as a line for clarity) between first volume 35 and second volume 36. Transition region 37 may include amounts of metal-solvent catalyst varying between an amount of metal-solvent catalyst in first volume 35 and an amount of metal-solvent catalyst in second volume 36. Transition region 37 may comprise a relatively narrow region or a relatively thicker region extending between first volume 35 and second volume 36.

Figure 4:
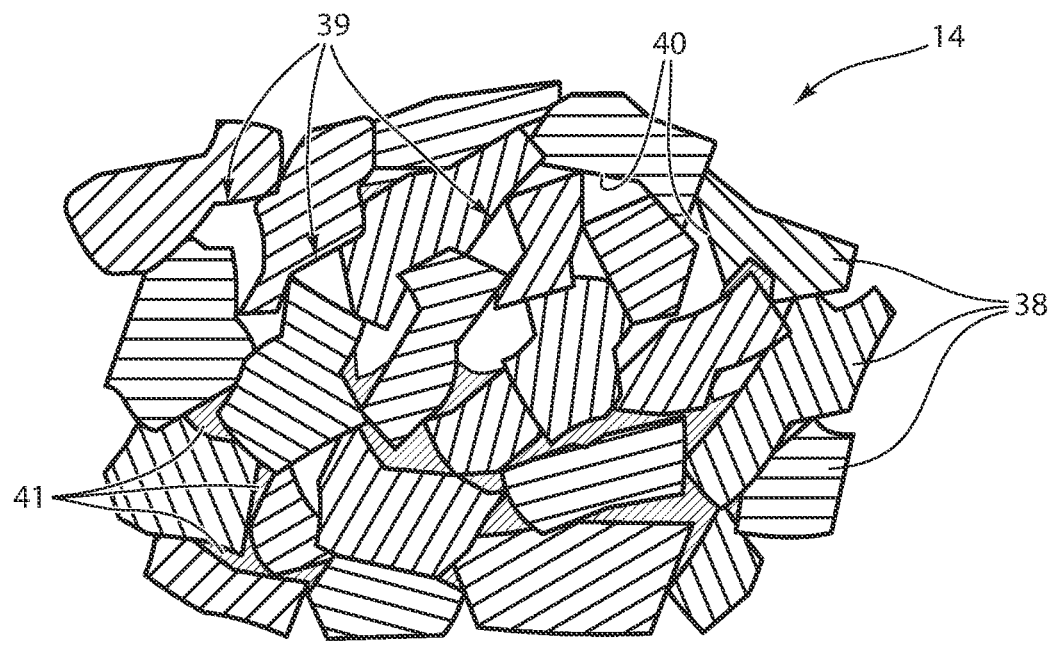
FIG. 4 is a magnified cross-sectional side view of a portion of the superabrasive table illustrated in FIG. 3.

FIG. 4 is a magnified cross-sectional side view of a portion of the superabrasive table 14 illustrated in FIG. 3. As shown in FIG. 4, superabrasive table 14 may comprise grains 38 and interstitial regions 39 between grains 38 defined by grain surfaces 40. Grains 38 may comprise grains formed of any suitable superabrasive material, including, for example, diamond grains. At least some of grains 38 may be bonded to one or more adjacent grains 38, forming a polycrystalline diamond matrix.

Interstitial material 41 may be disposed in at least some of interstitial regions 39. Interstitial material 41 may comprise any suitable material, including, for example, a metal-solvent catalyst. As shown in FIG. 4, at least some of interstitial regions 39 may be substantially free of interstitial material 41. At least a portion of interstitial material 41 may be removed from at least some of interstitial regions 39 during a leaching procedure. For example, a substantial portion of interstitial material 41 may be removed from first volume 35 during a leaching procedure. Additionally, interstitial material 41 may remain in a second volume 36 following a leaching procedure.

Figure 5A:
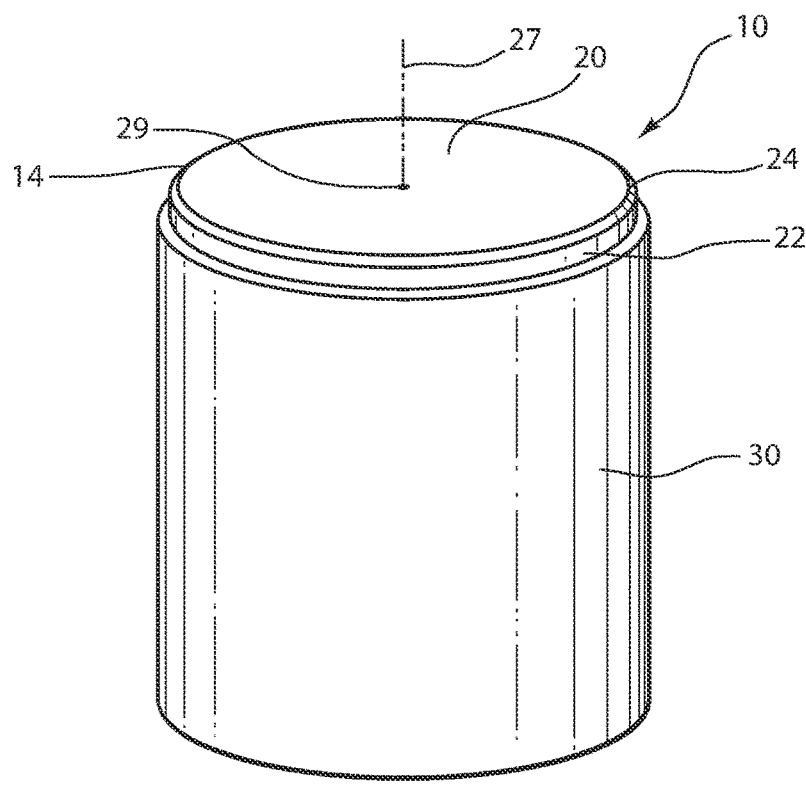
FIG. 5A is a perspective view of an exemplary superabrasive element that is partially surrounded by a protective layer.
Figure 5B:
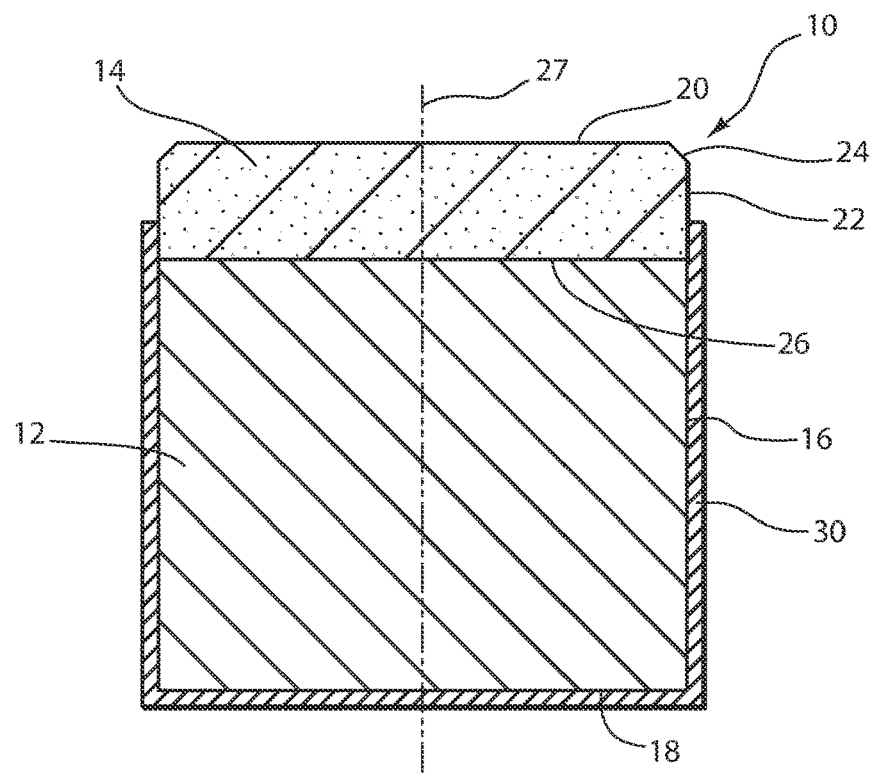
FIG. 5B is a cross-sectional side view of the superabrasive element and protective layer illustrated in FIG. 5A.

FIGS. 5A-5D are perspective and cross-sectional side views of exemplary superabrasive elements 10 that are at least partially surrounded by a protective layer 30 according to various embodiments. As shown in FIGS. 5A and 5B, protective layer 30 may be formed over at least a portion of superabrasive element 10, including substrate 12. According to various embodiments, a protective layer may also be formed over at least a portion of a superabrasive disc (e.g., superabrasive disc 28 illustrated in FIG. 2). Protective layer 30 may prevent damage to superabrasive element 10 when superabrasive element 10 is exposed to various reactive agents. For example, protective layer 30 may prevent a leaching solution from chemically damaging certain portions of superabrasive element 10, such as portions of substrate 12, portions of superabrasive table 14, or both, during leaching.

In various examples, protective layer 30 may comprise one or more materials that are substantially inert and/or otherwise resistant to acids, bases, and/or other reactive compounds present in a leaching solution used to leach superabrasive element 10. In some embodiments, protective layer 30 may comprise one or more materials exhibiting significant stability at various temperatures and/or pressures, including elevated temperatures and/or pressures used in sintering, leaching, and/or otherwise processing superabrasive element 10. According to various embodiments, protective layer 30 may comprise any suitable material, including metals, alloys, polymers, carbon allotropes, oxides, carbides, glass materials, ceramics, composites, and/or any combination of the foregoing, without limitation.

In some embodiments, protective layer 30 may comprise one or more metallic compounds and/or alloys. Suitable metallic compounds may include, without limitation, refractory metals, precious metals, and/or platinum group metals such as gold and/or platinum. In various examples, protective layer 30 may comprise metal alloys including, without limitation, steel and/or steel derivative alloys such as INCONEL (Special Metals Corporation, Huntington, WV) superalloys.

In various embodiments, protective layer 30 may comprise one or more refractory materials exhibiting significant chemical stability and/or strength under a wide range of conditions, including elevated temperature and/or pressure conditions. According to at least one embodiment, suitable refractory materials may include refractory metals such as, for example, niobium, tantalum, molybdenum, tungsten, rhenium, chromium, vanadium, hafnium, and/or zirconium. According to some examples, suitable refractory materials may include various oxides, carbides, carbon allotropes, composites, and/or combinations of the foregoing.

In various embodiments, protective layer 30 may include one or more polymeric materials, without limitation. For example, protective layer 30 may comprise one or more thermoplastic polymer materials, including, without limitation, polyolefin, fluoropolymer, polyvinyl chloride ("PVC"), neoprene, silicone elastomer, and/or synthetic rubber materials. Suitable fluoropolymers may include, for example, polytetrafluoroethylene ("PTFE"), fluorinated ethylene propylene, and/or polyvinylidene difluoride ("PVDF"). In some embodiments, protective layer 30 may comprise a heat-shrink material configured to contract against a selected portion of superabrasive element 10 following exposure to heat and/or pressure, as described in greater detail below with reference to FIGS. 11-13.

In additional embodiments, protective layer 30 may comprise a thermosetting and/or thermoplastic material that may be cured and/or affixed to superabrasive element 10 through the application of, for example, heat, pressure, and/or UV radiation. Suitable thermosetting materials may include, for example, phenolic, epoxy, polyimide, silicone, and/or various other polymeric thermosetting materials. Examples of suitable thermosetting materials may include, without limitation, EPOMET (Buehler, Ltd., Lake Bluff, IL) epoxy resins, KONDUCTOMET (Buehler, Ltd., Lake Bluff, IL) phenolic resins, and/or BAKELITE phenolic resins.

In some embodiments, protective layer 30 may include one or more forms of carbon, including, for example, graphite, diamond, amorphous carbon, and/or other suitable carbon allotropes. In at least one embodiment, protective layer 30 may comprise ceramic and/or glass materials. For example, protective layer 30 may comprise a coating and/or sealant composition including one or more ceramic and/or glass compounds. Suitable glass materials may include, for example, AREMCO-SEAL (Aremco Products, Inc., Valley Cottage, NY) high-temperature glass sealants. In some embodiments, protective layer 30 may primarily comprise carbon, ceramic, and/or glass materials. In various embodiments, carbon, ceramic, and/or glass materials may be combined with and/or dispersed throughout other materials in protective layer 30. For example, carbon, ceramic, and/or glass particles and/or fibers may be dispersed throughout a polymeric-based material.

Protective layer 30 may comprise a material that is configured to be directly and/or indirectly formed over at least a portion of superabrasive element 10. For example, at least a portion of protective layer 30 may be affixed to surface portions of substrate 12 and/or superabrasive table 14 such that a leaching solution is prevented or inhibited from passing between protective layer 30 and superabrasive element 10. Protective layer 30 may be formed over at least a portion of substrate 12 and/or superabrasive table 14 of superabrasive element 10 through any suitable mechanism, without limitation. In at least one example, protective layer 30 may be bonded to an exterior portion of superabrasive element 10 through ionic bonds, covalent bonds, and/or various intermolecular bonds. In some examples, protective layer 30 may be affixed to superabrasive element 10 through mechanical and/or frictional attachment of protective layer 30 to superabrasive element 10. Protective layer 30 may also be affixed to at least a portion of substrate 12 and/or superabrasive table 14 of superabrasive element 10 through interference fitting.

In some embodiments, protective layer 30 may comprise a solid layer that is formed over superabrasive element 10. For example, protective layer 30 may be fused to superabrasive table 14 and/or substrate 12 by applying elevated heat and/or pressure to protective layer 30 and/or superabrasive element 10. In at least one example, protective layer 30 may comprise a solid member (e.g., a solid container or cup) that is placed adjacent to a particulate mixture (e.g., particulate mixture 32 illustrated in FIG. 6A) and/or substrate 12 prior to forming superabrasive table 14. Subsequently, elevated temperature and pressure may be applied to protective layer 30, the particulate mixture, and substrate 12, thereby sintering the particulate mixture to form superabrasive table 14 and affixing protective layer 30 to superabrasive table 14 and/or substrate 12.

In various embodiments, protective layer 30 may be placed adjacent to a superabrasive element 10 that comprises a previously sintered superabrasive table 14. Elevated temperature and/or pressure may then be applied to protective layer 30 and/or superabrasive element 10, thereby fusing protective layer 30 to at least a portion of superabrasive element 10. Suitable techniques utilizing elevated heat and/or pressure to affix protective layer 30 to superabrasive element 10 may include, without limitation, heating and pressurizing protective layer 30 in a high-temperature/high-pressure oven, heating and pressurizing protective layer 30 in a mounting press, heating protective layer 30 in a vacuum oven, swaging protective layer 30, crimping protective layer 30, and/or heat-shrinking protective layer 30.

In some embodiments, a combination of elevated heat and/or pressure may cause portions of protective layer 30 to at least partially conform to projections, cavities, indentations, and/or other surface irregularities defined by and/or adjacent to a surface portion of superabrasive element 10. By at least partially conforming to surface irregularities formed and/or defined by superabrasive element 10, protective layer 30 may be mechanically affixed to at least a portion of substrate 12 and/or superabrasive table 14.

In some embodiments, a thermosetting material, such as a thermosetting resin, may be disposed adjacent a surface portion of superabrasive element 10 and cured to form protective layer 30 through the application of heat and/or pressure. In various embodiments, a material used to form protective layer 30, such as a metallic composition and/or thermoplastic resin, may be heated to a temperature above the melting point of the material and applied to a surface portion of superabrasive element 10. The melted composition may then be solidified to form protective layer 30 by cooling the composition below the melting point.

According to some embodiments, a material used to form protective layer 30 may be applied to an exterior of superabrasive element 10 as a solution and/or as an uncured or semi-cured composition. Such materials may then be solidified to form protective layer 30 using any suitable technique. For example, solvent components may be evaporated from a solution to form protective layer 30. In various examples, a material may be cured to form protective layer 30 by exposing the material to an appropriate amount of temperature, pressure, and/or radiation. For example, materials may be cured to form superabrasive 30 by, for example, exposing the materials to heat, ultraviolet radiation, microwave radiation, ultrasonic energy, and/or a curing agent. In one example, protective layer 30 may comprise a photopolymer.

According to some embodiments, protective layer 30 may be formed over superabrasive element 10 by disposing an intermediate material between at least a portion of protective layer 30 and superabrasive element 10 (e.g., intermediate layer 42 illustrated in FIG. 9). For example, an adhesive compound may be disposed between protective layer 30 and superabrasive element 10, affixing protective layer 30 to superabrasive element 10. According to some embodiments, a layer of thermoplastic adhesive may be disposed on an inside portion of protective layer 30 adjacent to superabrasive element 10. In at least one example, an intermediate layer may be affixed to at least a portion of superabrasive element 10 and to at least a portion of protective layer 30.

In one example, protective layer 30 may comprise an adhesive tape. In some examples, a solvent may be applied to protective layer 30, at least partially dissolving a portion of protective layer 30. The at least partially dissolved portion of protective layer 30 may be placed in contact with superabrasive element 10. Subsequently, the solvent may be evaporated and the at least partially dissolved portion of protective layer 30 may solidify and adhere to superabrasive element 10.

Protective layer 30 may be selectively formed over or applied to portions of substrate 12 and/or superabrasive table 14 in any pattern, design, or as otherwise desired, without limitation. According to some embodiments, protective layer 30 may be formed over a selected portion of superabrasive element 10 such that an exposed surface region of superabrasive element 10 is exposed. For example, protective layer 30 may be affixed to a selected portion of superabrasive element 10 that includes at least a portion of substrate 12 and/or superabrasive table 14.

As illustrated in FIG. 5B, protective layer 30 may be formed over a selected portion of superabrasive element 10 that includes rear face 18 and substrate side surface 16 of substrate 12, thereby inhibiting or preventing undesired corrosion of substrate 12 during leaching. As further shown in FIG. 5B, the selected portion may also include a portion of superabrasive side surface 22 of superabrasive table 14, further inhibiting or preventing a leaching solution from contacting substrate 12 and/or a portion of superabrasive table 14 adjacent to substrate 12. An exposed surface region of superabrasive element 10 that is not covered by protective layer 30 may include portions of superabrasive table 14, including at least a portion of superabrasive side surface 22 and superabrasive face 20, as illustrated in FIGS. 5A and 5B.

According to some embodiments, protective layer 30 may be formed over superabrasive table 14 such that protective layer 30 is not formed on portions of superabrasive table 14 that are configured to be used as cutting surfaces and/or cutting edges (e.g., cutting surface and/or cutting edges of a cutting element). In at least one embodiment, protective layer 30 may be formed on or applied to superabrasive table 14 in an alternating pattern such that alternating leached and unleached regions may be formed on superabrasive table 14. Forming protective layer 30 over superabrasive element 10 in such configurations may enable selective optimization of various characteristics of superabrasive element 10 through selective leaching of superabrasive table 14.

During leaching, a region of superabrasive element 10 that is not covered by protective layer 30 (i.e., an exposed surface region) may be exposed to a leaching solution during leaching. Additionally, the leaching solution may be inhibited or prevented from contacting a region which is covered by protective layer 30. Accordingly, the leaching solution may be inhibited or prevented from dissolving and/or corroding portions of superabrasive element 10 at and/or adjacent to a selected portion on which protective layer 30 is formed. The leaching solution may also be inhibited or prevented from migrating between superabrasive element 10 and protective layer 30, further protecting portions of superabrasive element 10 at and/or adjacent to the selected portion.

According to various embodiments, edges of protective layer 30 may be securely affixed to superabrasive element 10, thereby preventing the edges from separating from superabrasive element 10 under various conditions, such as conditions existing during leaching and/or HPHT sintering. The edges of protective layer 30 may clearly define one or more regions of superabrasive element 10 to be leached, such as an exposed surface region, while preventing leaching of selected regions of superabrasive element 10, such as a selected portion on which protective layer 30 is formed.

In order to securely fix edges of protective layer 30 to superabrasive element 10, protective layer 30 may comprise a material that is capable of strongly affixing to superabrasive table 14 and/or substrate 12 under various conditions. In some embodiments, protective layer 30 may also comprise a material that is capable of substantially maintaining its shape and/or configuration during sintering and/or leaching of superabrasive element 10. For example, protective layer 30 may comprise a material that is substantially resistant to various compounds present in a leaching solution. Protective layer 30 may also comprise a material that is substantially resistant to expansion and/or shrinkage under conditions present during sintering and/or leaching of superabrasive element 10. Such materials may include one or more of the above-described materials suitable for use in protective layer 30, without limitation.

Superabrasive element 10 may comprise any suitable shape, including, without limitation, a symmetrical or a non-symmetrical shape. In at least one embodiment, as illustrated in FIGS. 5A and 5B, superabrasive element 10 may comprise a generally cylindrical element centered about a central axis 27. A location where central axis 27 intersects superabrasive face 20 may be represented by central location 29.

In various embodiments, as illustrated in FIGS. 5A and 5B, a superabrasive edge 24 (e.g., a chamfered cutting edge) extending between superabrasive side surface 22 and superabrasive face 20 may be formed on superabrasive table 14. Superabrasive edge 24 may be formed prior to or following sintering of superabrasive element 10. In a case where superabrasive edge 24 is formed following sintering of superabrasive element 10, protective layer 30 may be removed from superabrasive element 10 prior to formation of superabrasive edge 24 using any suitable technique, including, for example, lapping and/or grinding.

Protective layer 30 may be removed from superabrasive element 10 such that outer surfaces of superabrasive element 10, including substrate side surface 16 and/or superabrasive side surface 22, are substantially centered about central axis 27. Superabrasive element 10 may then be placed on a collet or other holding member sized to fit around and securely hold an outer surface of superabrasive element 10, such as substrate side surface 16. Such a collet or holding member may secure superabrasive element 10 to a grinding machine. The grinding machine (e.g., an outer diameter or OD grinder) may then rotate the collet, causing sup erabrasive element 10 to rotate about central axis 27. As superabrasive element 10 rotates, a grinding surface, such as an abrasive surface suited for removing material from superabrasive table 14, may grind an edge portion of superabrasive table 14 until a desired superabrasive edge 24 is obtained.

In a case where superabrasive edge 24 is formed prior to leaching of superabrasive element 10, protective layer 30 may remain on at least a portion of superabrasive element 10 during formation of superabrasive edge 24. For example, as illustrated in FIG. 5B, protective layer 30 may surround outer portions of superabrasive element 10, such as substrate side surface 16 and/or superabrasive side surface 22. In some examples, protective layer 30 may have an uneven outer profile that is not centered about central axis 27.

In various embodiments, using a collet and an OD grinding machine to process a superabrasive element 10 having an uneven outer profile defined by protective layer 30 may result in the formation of a relatively nonuniform and/or uneven superabrasive edge 24. In order to form a desired edge geometry (e.g., a relatively uniform superabrasive edge 24) on a superabrasive element 10 surrounded by an uneven protective layer 30, a reference mark may be formed on superabrasive element 10 at any suitable location, such as a central location on superabrasive table 14. For example, a reference mark may be made on superabrasive face 20 at and/or near central location 29. A reference mark may also be placed on any other suitable portion of superabrasive element 10, without limitation. A reference mark formed on superabrasive element 10 may include an ink or painted coating applied to superabrasive element 10, an indentation and/or notch formed in superabrasive element 10, and/or any other suitable type of mark or location indicator, without limitation.

A computer numerical control ("CNC") grinding machine, such as a centerless CNC grinding machine, may utilize the reference mark as a guide to form a relatively even superabrasive edge 24 on superabrasive table 14. For example, a CNC grinding machine may be programmed to lock onto the reference mark using one or more sensors while superabrasive table 14 is being ground to form superabrasive edge 24. In some examples, a CNC grinding machine may be programmed to utilize the reference mark as an indicator of the location of central axis 27 and/or the location of an outer surface of superabrasive element 10, enabling superabrasive edge 24 to be formed as desired (e.g., in a relatively uniform manner about central axis 27), regardless of variations in protective layer 30 and/or variations in outer surface portions of superabrasive element 10.

In at least one example, a CNC grinding machine may also be used to form edges on non-cylindrical and/or asymmetrical elements. For example, one or more reference marks may be made on a non-cylindrical and/or asymmetrical superabrasive element to indicate various points of reference that may be utilized by a CNC grinding machine to form any desired edge geometry, such as relatively evenly chamfered edges.

Figure 5C:
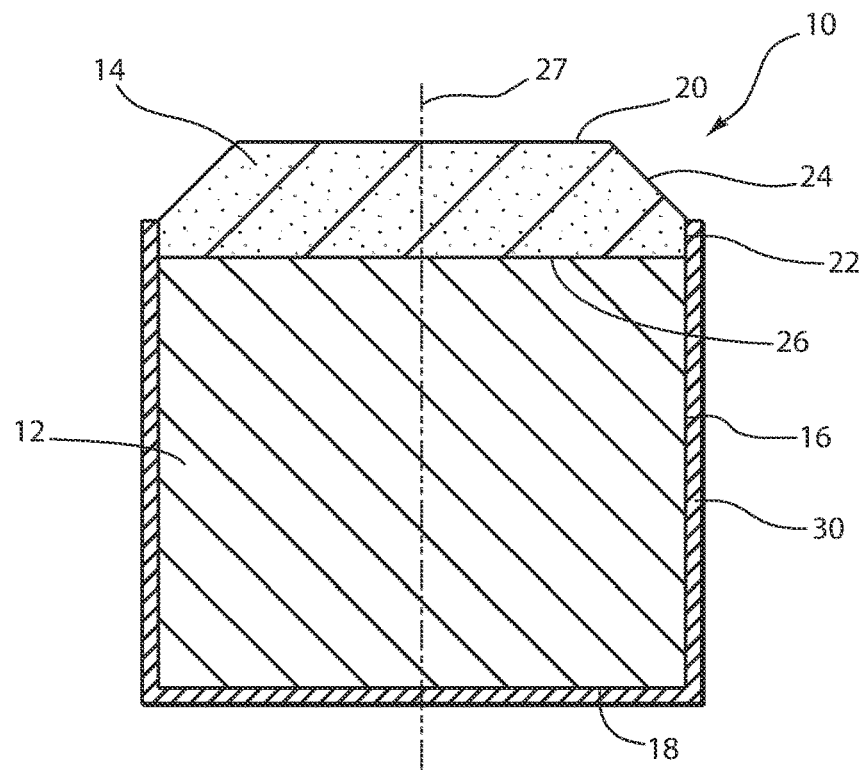
FIG. 5C is a cross-sectional side view of an exemplary superabrasive element and protective layer according to at least one embodiment.
Figure 5D:
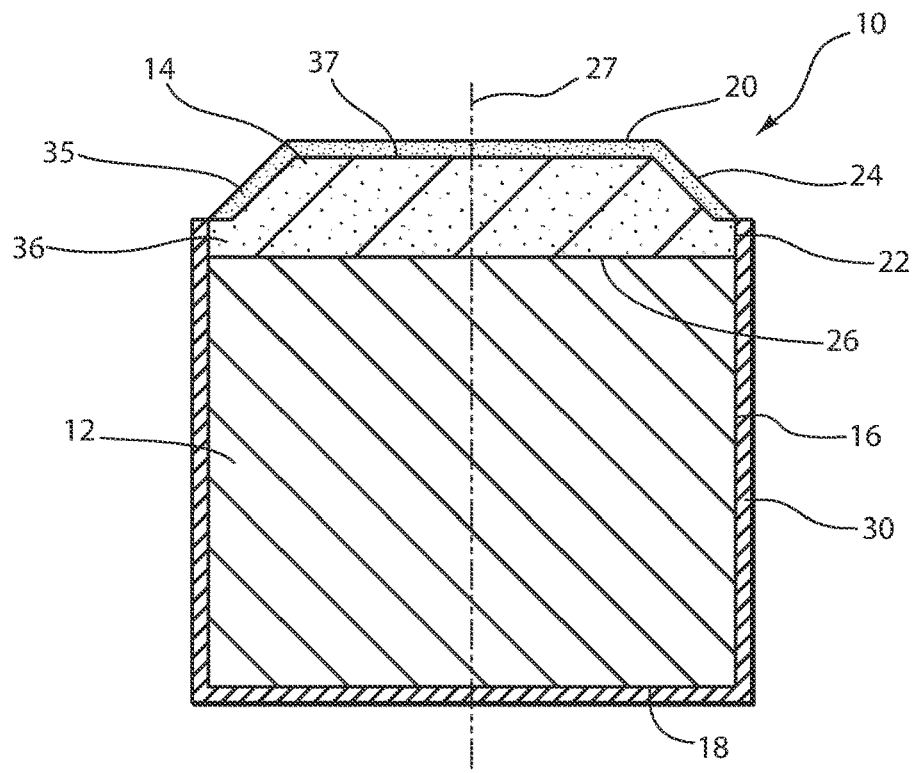
FIG. 5D is a cross-sectional side view of the superabrasive element and protective layer illustrated in FIG. 5C following leaching of at least a portion of the superabrasive element.

FIGS. 5C and 5D are cross-sectional side views of an exemplary superabrasive element 10 that is at least partially surrounded by protective layer 30 according to various embodiments. As illustrated in FIG. 5C, protective layer 30 may substantially cover superabrasive side surface 22 up to superabrasive edge 24. When superabrasive element 10 is exposed to a leaching solution, the leaching solution may contact superabrasive face 20 and superabrasive edge 24 and portions of superabrasive table 14 adjacent to superabrasive face 20 and superabrasive edge 24 may be leached by the solution. Protective layer 30 may substantially prevent a leaching solution from contacting superabrasive side surface 22. Accordingly, as illustrated in FIG. 5D, a leached volume, or first volume 35 (e.g., first volume 35 in FIG. 3), may be located adjacent to superabrasive face 20 and superabrasive edge 24 following leaching. In at least one example, at least a portion of superabrasive table 14 and protective layer 30 may be removed through grinding to form superabrasive edge 24, as illustrated in FIGS. 5C and 5D.

FIGS. 6A-6C illustrate an exemplary sintering configuration for forming a superabrasive element 10 and forming a protective layer 30 over superabrasive element 10 according to at least one embodiment. As illustrated in FIGS. 6A-6C, protective layer 30 may be formed from a sintering container used in sintering superabrasive element 10. Protective layer 30 may be fused to superabrasive element 10 during sintering of superabrasive table 14.

FIG. 6A is a cross-sectional side view of an exemplary sintering configuration for forming a superabrasive element. As illustrated in this figure, substrate 12 may be disposed adjacent to a particulate mixture 32, and substrate 12 and particulate mixture 32 may be surrounded by protective layer 30. In at least one embodiment, protective layer 30 may comprise a sintering container or cartridge configured to surround and hold substrate 12 and particulate mixture 32 during sintering. Particulate mixture 32 may comprise a mixture of superhard particles, such as, for example, diamond particles. In some embodiments, particulate mixture 32 may also comprise a metal-solvent catalyst dispersed with diamond particles. For example, particulate mixture 32 may comprise particles of cobalt intermixed with diamond particles. In some embodiments, substrate 12 may comprise a metal-solvent catalyst that flows into particulate mixture 32 during sintering. For example, substrate 12 may comprise a cobalt-cemented tungsten carbide material.

In some examples, as illustrated in FIG. 6A, substrate 12 may be loaded into the sintering container such that substrate 12 contacts a rear surface of the sintering container.

Particulate mixture 32 may then be loaded into the sintering container adjacent substrate 12 and a cover 34 may be placed at a front end of the sintering container adjacent particulate mixture 32. Accordingly, protective layer 30 and cover 34 may form a sintering container encasing substrate 12 and particulate mixture 32. In some examples, particulate mixture 32 may be loaded into the sintering container first, followed by substrate 12. Cover 34 may then be placed adjacent substrate 12.

Protective layer 30 and/or cover 34 may comprise any material or combination of materials suitable for encasing substrate 12 and particulate mixture 32 during sintering. For example, protective layer 30 and/or cover 34 may comprise a material or combination of materials capable of withstanding high temperatures and/or pressures during HPHT sintering. For example, protective layer 30 and/or cover 34 may comprise one or more refractory metals, including, for example, niobium, tantalum, molybdenum, tungsten, rhenium, chromium, vanadium, hafnium, and/or zirconium. Protective layer 30 and/or cover 34 may also comprise any other metallic and/or nonmetallic material suitable for encasing substrate 12 and/or particulate mixture 32 during sintering.

FIG. 6B is a cross-sectional side view of the exemplary sintering configuration illustrated in FIG. 6A following sintering of particulate mixture 32 to form superabrasive table 14. During HPHT sintering, substrate 12, particulate mixture 32, protective layer 30, and/or cover 34 may be subjected to ultra-high temperatures and pressures. Under these HPHT sintering conditions, adjacent superhard particles, such as diamond particles, may become bonded to each other to form superabrasive table 14 comprising a superhard and/or superabrasive material, such as, for example, a polycrystalline diamond material comprising a network of superhard grains (e.g., grains 38 illustrated in FIG. 4).

During the HPHT sintering process, superhard grains adjacent to substrate 12 may become bonded to substrate 12 at interface 26. In at least one embodiment, a metallic compound, such as a metal-solvent catalyst, may be melted during HPHT sintering and may be disposed between interstitial spaces and/or cavities in superabrasive table 14 and/or substrate 12. Following HPHT sintering, the metallic compound may be cooled and hardened, securely bonding superabrasive table 14 to substrate 12 at interface 26.

Figure 7A:
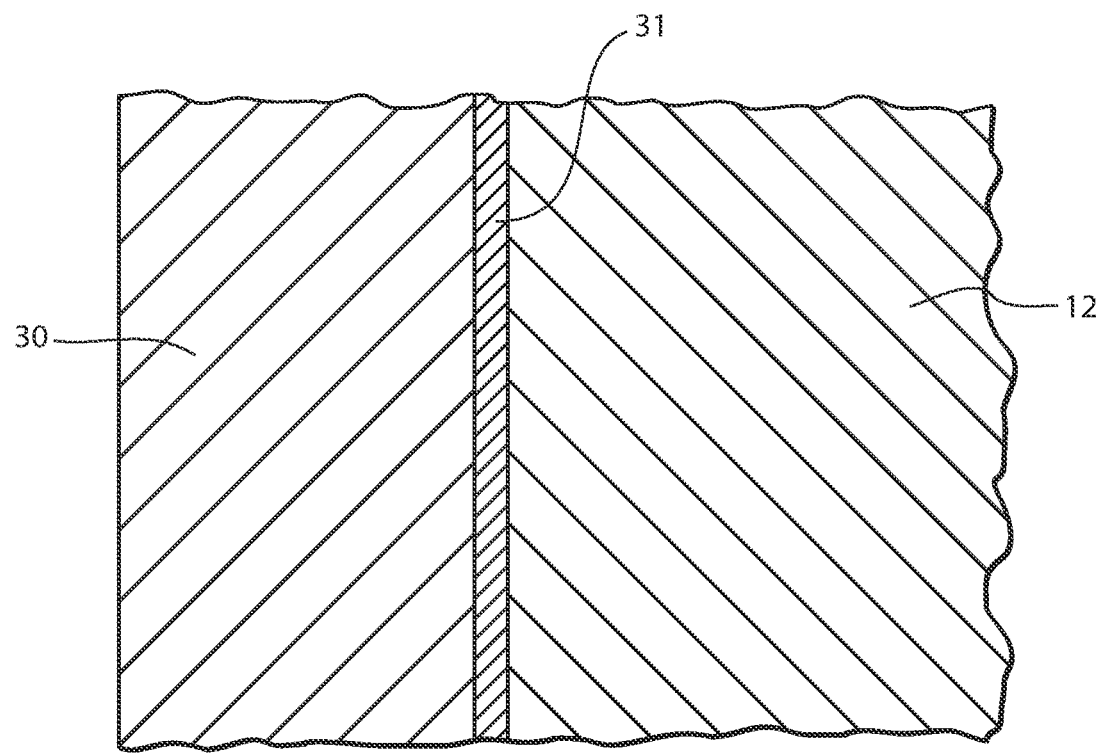
FIG. 7A is a cross-sectional side view of a portion of a protective layer formed over a selected portion an exemplary superabrasive element according to at least one embodiment.
Figure 7B:
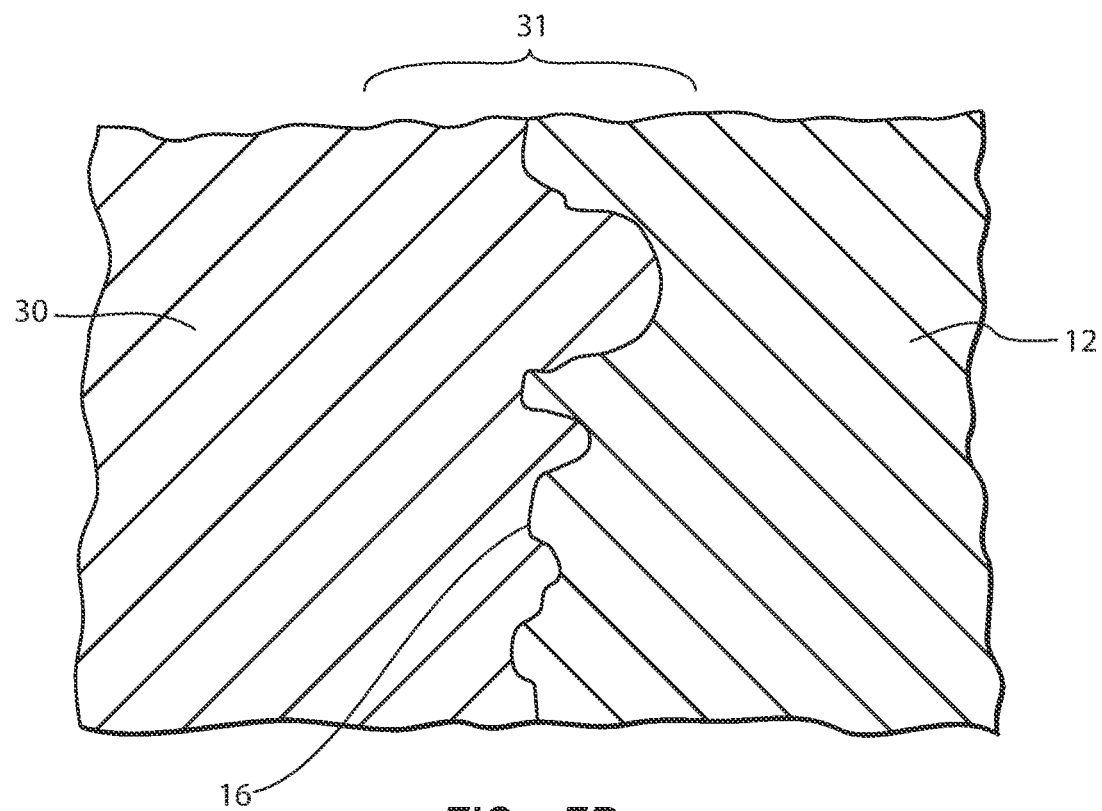
FIG. 7B is a magnified cross-sectional side view of a portion of the exemplary superabrasive element and the protective layer illustrated in FIG. 7A.

According to at least one embodiment, following HPHT sintering, at least a portion of protective layer 30 may be bonded and/or otherwise affixed to superabrasive table 14 and/or substrate 12 at an interface 31 extending between protective layer 30 and table 14 and/or between protective layer 30 and substrate 12 (e.g., interface 31 illustrated in FIGS. 7A and 7B). In some embodiments, a combination of elevated heat and/or pressure may cause portions of protective layer 30 to at least partially conform to projections, cavities, indentations, and/or other surface irregularities defined by and/or adjacent to a surface portion of superabrasive element 10, such as a surface portion of substrate 12 and/or superabrasive table 14. By at least partially conforming to surface irregularities defined by superabrasive element 10, protective layer 30 may be affixed to at least a portion of substrate 12 and/or superabrasive table 14.

In some examples, cover 34 may also be affixed to at least a portion of superabrasive table 14 and/or substrate 12 following sintering. Cover 34 and/or protective layer 30 may be removed from at least a portion of superabrasive table. For example, as illustrated in FIG. 6B, cover 34 and a portion of protective layer 30 may be removed from a portion of superabrasive table 14 using any suitable technique, such as, for example, lapping or grinding.

FIG. 6C is a cross-sectional side view of the exemplary sintering configuration illustrated in FIGS. 6A and 6B after a portion of protective layer 30 has been removed from at least a portion of superabrasive element 10. As illustrated in FIG. 6C, a portion of protective layer 30 may be selectively removed from a portion of superabrasive side surface 22 of superabrasive table 14. According to various embodiments, protective layer 30 may be removed from a portion of superabrasive element 10 such that protective layer 30 is affixed to a selected portion of superabrasive element 10 and such that an exposed surface region of superabrasive element 10 is exposed. For example, as illustrated in FIG. 6C, protective layer 30 may be selectively removed from at least a portion of superabrasive table 14, thereby exposing an exposed surface region of superabrasive element 10 that includes at least a portion of superabrasive side surface 22 and/or superabrasive face 20.

Following removal of a portion of protective layer 30 from superabrasive element 10, protective layer 30 may remain affixed to a selected portion of superabrasive element 10. In at least one example, protective layer 30 may remain affixed to a selected portion of superabrasive element 10 that includes at least a portion of substrate 12 and/or superabrasive table 14. In some examples, as illustrated in FIG. 6C, protective layer 30 may be affixed to a selected portion that includes rear face 18 and substrate side surface 16 of substrate 12 and at least a portion of superabrasive side surface 22 of superabrasive table 14. In at least one embodiment, after protective layer 30 has been affixed to at least a portion of superabrasive element 10, a chamfered and/or rounded surface (e.g., superabrasive edge 24 illustrated in FIGS. 5A and 5B) may be formed between superabrasive face 20 and superabrasive side surface 22 prior to leaching of superabrasive element 10.

After superabrasive element 10 has been leached, the remaining protective layer 30 may be removed from superabrasive element 10. In at least one embodiment, protective layer 30 may be substantially removed from superabrasive table 14 and/or substrate 12 using any suitable technique, including, for example, lapping and/or grinding. In some embodiments, following removal of protective layer 30, one or more surfaces of superabrasive table 14 and/or substrate 12 may be processed to form a desired surface texture and/or finish using any suitable technique, including, for example, lapping, grinding, and/or otherwise physically and/or chemically treating the one or more surfaces.

FIG. 7A is a cross-sectional side view of a portion of an exemplary substrate 12, a protective layer 30 formed over superabrasive element 10, and an interface 31 formed between substrate 12 and protective layer 30 according to at least one embodiment. According to at least one embodiment, protective layer 30 may be affixed to superabrasive element 10 at interface 31. For example, as illustrated in FIG. 7A, at least a portion of interface 31 may comprise a region extending between protective layer 30 and substrate 12. According to some embodiments, interface 31 may comprise portions of both protective layer 30 and superabrasive element 10 (e.g., an alloy). For example, interface 31 may comprise a hybrid layer or region formed by portions of protective layer 30, substrate 12, and/or superabrasive table 14.

FIG. 7B is a magnified cross-sectional side view of a portion of exemplary substrate 12, protective layer 30, and interface 31 illustrated in FIG. 7A. As shown in FIG. 7B, interface 31 may include an intercalated hybrid layer formed between superabrasive element 10 and protective layer 30. The portion of interface 31 illustrated in FIG. 7B may include a portion of protective layer 30 attached to a substrate side surface 16 of substrate 12.

Substrate 12 may include a plurality of projections, cavities, indentations, and/or other surface irregularities defined by and/or adjacent to a substrate side surface 16. According to at least one embodiment, portions of protective layer 30 may be disposed between adjacent portions of substrate 12. For example, portions of protective layer 30 may at least partially fill cavities and/or indentations defined within substrate 12. Portions of protective layer 30 may also at least partially surround projections extending from substrate 12. Accordingly, as shown in FIG. 7B, protective layer 30 and substrate 12 may form an intercalated hybrid layer at interface 31, with the intercalated hybrid layer comprising alternating intermeshed portions of protective layer 30 and substrate 12.

An interface, such as interface 31, may also extend between protective layer 30 and a superabrasive table 14. Such an interface may include an intercalated hybrid layer comprising alternating, intermeshed portions of protective layer 30 and superabrasive table 14. Superabrasive table 14 may comprise numerous projections, cavities, indentations, interstices, and/or other surface irregularities defined by and/or adjacent to surface portions of superabrasive table 14. Such surface irregularities on portions of superabrasive table 14, such as superabrasive side surface 22, may be defined by various superhard grains (e.g., grains 38 as illustrated in FIG. 4) and/or by interstitial materials disposed between the superhard grains (e.g., interstitial material 41 as illustrated in FIG. 4).

Interface 31 comprising an intercalated hybrid layer may be formed as protective layer 30 is formed over superabrasive element 10 in accordance with any of the techniques disclosed herein, without limitation. An intercalated hybrid layer may be formed by applying elevated temperatures and/or pressures to superabrasive element 10 and protective layer 30. Elevated temperatures and/or pressures may cause deformation of protective layer 30, causing portions of protective layer 30 to become intermeshed with portions of superabrasive element 10 to form an intercalated hybrid layer comprising intercalated portions of protective layer 30 and superabrasive element 10. In various embodiments, superabrasive element 10 and protective layer 30 may be exposed to elevated temperatures and pressures during, for example, sintering of superabrasive table 14 and/or during molding of a thermosetting resin to form protective layer 30 around superabrasive element 10.

In some examples, protective layer 30 may be formed on at least a portion of superabrasive element 10 by applying a liquid composition and/or a powdered composition to an exterior of superabrasive element 10. The liquid and/or powdered composition may be subjected to elevated temperatures and/or pressures, causing the composition to become intermeshed with portions of element 10. The liquid and/or powdered composition may at least partially conform to and become intermeshed with surface irregularities defined by and/or adjacent to a surface portion of superabrasive element 10. Subsequently, the liquid and/or powdered composition may be fixed and hardened to form a protective layer 30 that is intercalated with a portion of superabrasive element 10 at interface 31.

According to some embodiments, protective layer 30 may comprise a solid element that is placed adjacent to a particulate mixture (e.g., particulate mixture 32 illustrated in FIG. 6A), and protective layer 30 may be formed over superabrasive element 10 following sintering. In such an example, protective layer 30 may comprise a material that is malleable under HPHT sintering conditions, such that portions of protective layer 30 at least partially conform to surface irregularities defined by and/or adjacent to a surface portion of superabrasive element 10. An interface 31 comprising an intercalated hybrid layer formed by alternating portions of protective layer 30 and substrate 12 and/or superabrasive table 14 may enable protective layer 30 to be securely fused to at least a portion of superabrasive element 10.

In at least one embodiment, forming an intercalated hybrid layer between protective layer 30 and superabrasive element 10 may enable protective layer 30 to be securely affixed to superabrasive element 10, even in situations where there is a minimal amount of molecular bonding between protective layer 30 and superabrasive element 10. In some examples, protective layer 30 may be mechanically secured to superabrasive element 10 by the intercalated hybrid layer. For example, the alternating and/or intermeshing portions of protective layer 30 and superabrasive element 10 forming the intercalated hybrid layer may mechanically fasten and hold protective layer 30 to superabrasive element 10.

Such an intercalated hybrid layer may also significantly increase the edge retention strength of protective layer 30, facilitating adhesion of edges of protective layer 30 to superabrasive element 10 under a variety of processing conditions. Accordingly, protective layer 30 may be prevented from separating from superabrasive element 10, allowing protective layer 30 to be secured to superabrasive element 10, even in configurations where protective layer 30 does not completely surround a periphery of superabrasive element 10. For example, protective layer 30 may be securely affixed to superabrasive element 10 in various patterns, such as an alternating pattern. Additionally, protective layer 30 may be securely affixed to superabrasive elements having various non-cylindrical and/or generally angular perimeters.

In at least one embodiment, because protective layer 30 is closely formed to various surface irregularities in superabrasive element 10 at interface 31, passageways between protective layer 30 and superabrasive element 10 allowing passage of a leaching solution may be significantly reduced or eliminated. Accordingly, protective layer 30 may protect selected portions of superabrasive element 10 under a variety of temperature and pressure conditions.

In some embodiments, portions of superabrasive element 10 that are affixed and/or adjacent to protective layer 30 may be protected from leaching, corrosion, and/or other damage under a relatively wide range of leaching conditions, including, for example, temperatures ranging between approximately 25° C. and approximately 250° C. and pressures ranging between approximately 1 bar and approximately 100 bar. In at least one embodiment, protective layer 30 may also enable leaching of superabrasive element 10 at temperatures below 25° C. or above 250° C. and/or at pressures below 1 bar and/or above 100 bar.

According to various embodiments, an interface 31 comprising an intercalated hybrid layer formed by protective layer 30 and superabrasive element 10 may minimize or eliminate gases trapped between protective layer 30 and superabrasive element 10. Reducing or eliminating trapped gases between protective layer 30 and superabrasive element 10 may reduce the likelihood that portions of protective layer 30 will become separated from superabrasive element 10. Accordingly, edges of protective layer 30 may be securely affixed to superabrasive element 10 and the formation of pockets between protective layer 30 and superabrasive element 10 due to the expansion of trapped gases may be significantly reduced. Reducing the formation of pockets between protective layer 30 and superabrasive element 10 may further reduce or eliminate the formation of passageways between protective layer 30 and superabrasive element 10 through which a leaching solution may migrate, thereby preventing undesired corrosion and/or damage to selected portions of superabrasive element 10 during leaching.

Figure 8A:
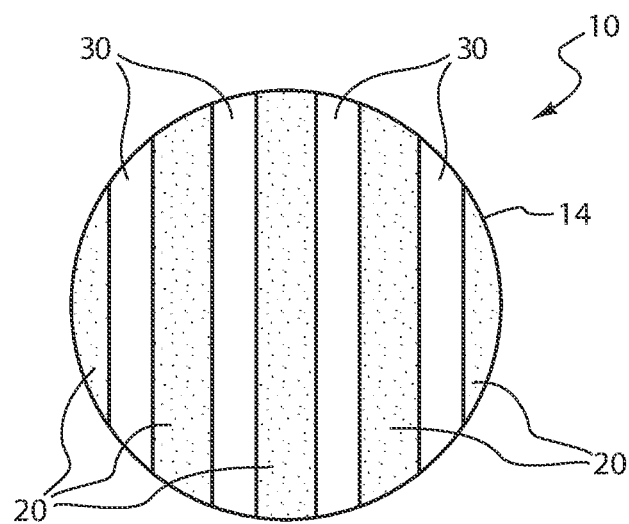
FIG. 8A is a top view of a superabrasive face of an exemplary superabrasive element and a patterned protective layer formed over a selected portion of the superabrasive face according to at least one embodiment.
Figure 8B:
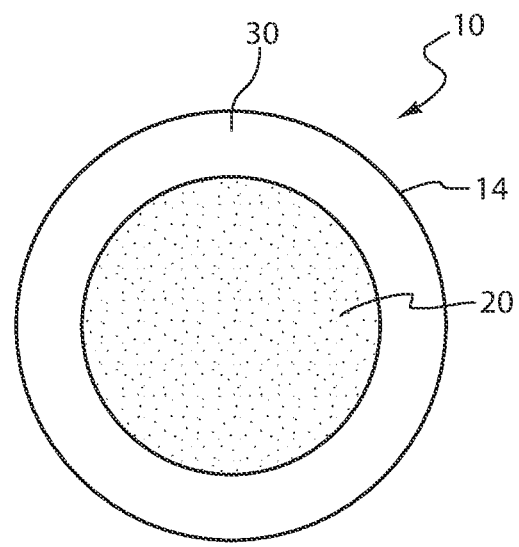
FIG. 8B is a top view of a superabrasive face of an exemplary superabrasive element and a protective layer formed over a selected portion of the superabrasive face according to at least one embodiment.
Figure 8C:
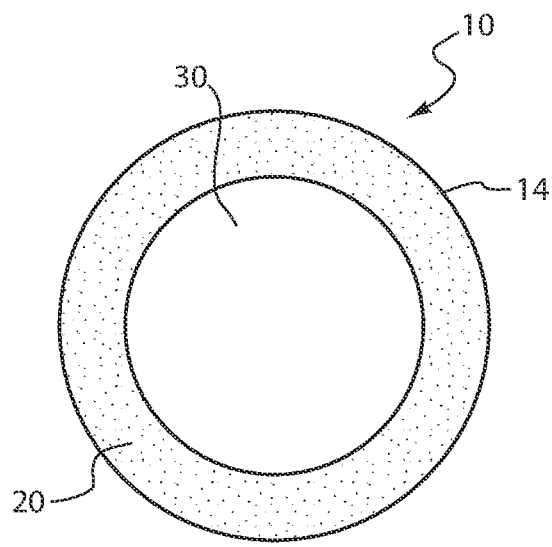
FIG. 8C is a top view of a superabrasive face of an exemplary superabrasive element and a protective layer formed over a selected portion of the superabrasive face according to at least one embodiment.

FIGS. 8A-8C illustrate various patterns of protective layers formed over exemplary superabrasive elements according to various embodiments. Protective layer 30 may be formed over portions of superabrasive element 10 in any suitable pattern, without limitation. Forming protective layer 30 on superabrasive element 10 such that an intercalated hybrid layer (e.g., interface 31 in FIGS. 7A-7B) is formed may enable protective layer 30 to be securely affixed to superabrasive element 10 in various patterns. In some examples, protective layer 30 may be applied to exterior portions of superabrasive element 10 in a substantially continuous layer, and subsequently, protective layer 30 may be removed from desired portions of super abrasive element 10 using any suitable technique, such as grinding and/or lapping. In additional embodiments, protective layer 30 may be patterned when it is formed on superabrasive element 10. For example, a protective layer 30 comprising a thermosetting compound may be formed and molded to an exterior of superabrasive element 10 using a mold configuration having a specified molding pattern.

Forming protective layer 30 on superabrasive table 14 according to various patterns may cause superabrasive table 14 to be selectively leached when exposed to a leaching solution. Alternating leached and non-leached regions of superabrasive table 14 may provide superabrasive element 10 with desired characteristics. For example, leached portions of superabrasive table 14 may exhibit relatively higher heat resistance and/or thermal stability and regions of superabrasive table 14 that are not leached may exhibit a relatively higher degree of compression and a relatively higher impact resistance.

FIG. 8A is a top view of a patterned protective layer 30 formed over superabrasive face 20 of superabrasive element 10 according to at least one embodiment. As illustrated in FIG. 8A, protective layer 30 may be arranged in an alternating pattern on superabrasive face 20, resulting in alternating leached and non-leached regions of superabrasive table 14 following leaching. A superabrasive table 14 leached according to an alternating pattern may, for example, exhibit both superior temperature stability and superior impact strength.

FIGS. 8B and 8C are top views of protective layers 30 formed over superabrasive faces 20 according to at least one embodiment. As illustrated in FIG. 8B, protective layer 30 may be formed over a selected region of a superabrasive table 14 near an outer edge portion (e.g., superabrasive edge 24 in FIG. 1) and a region of superabrasive table 14 that is separated from the outer edge portion may be exposed to a leaching solution during leaching. As illustrated in FIG. 8C, protective layer 30 may be formed over a selected region of superabrasive table 14 that is separated from the outer edge portion and an outer edge portion of superabrasive table 14 may be exposed to the leaching solution during leaching. Leaching superabrasive table 14 according to a pattern where edge portions of superabrasive table 14 are leached differently from other portions of superabrasive table 14 may result in superabrasive table 14 exhibiting different characteristics at edge portions of superabrasive table 14, such as cutting regions of superabrasive table 14 (e.g. superabrasive edge 24 in FIG. 1).

Figure 9A:
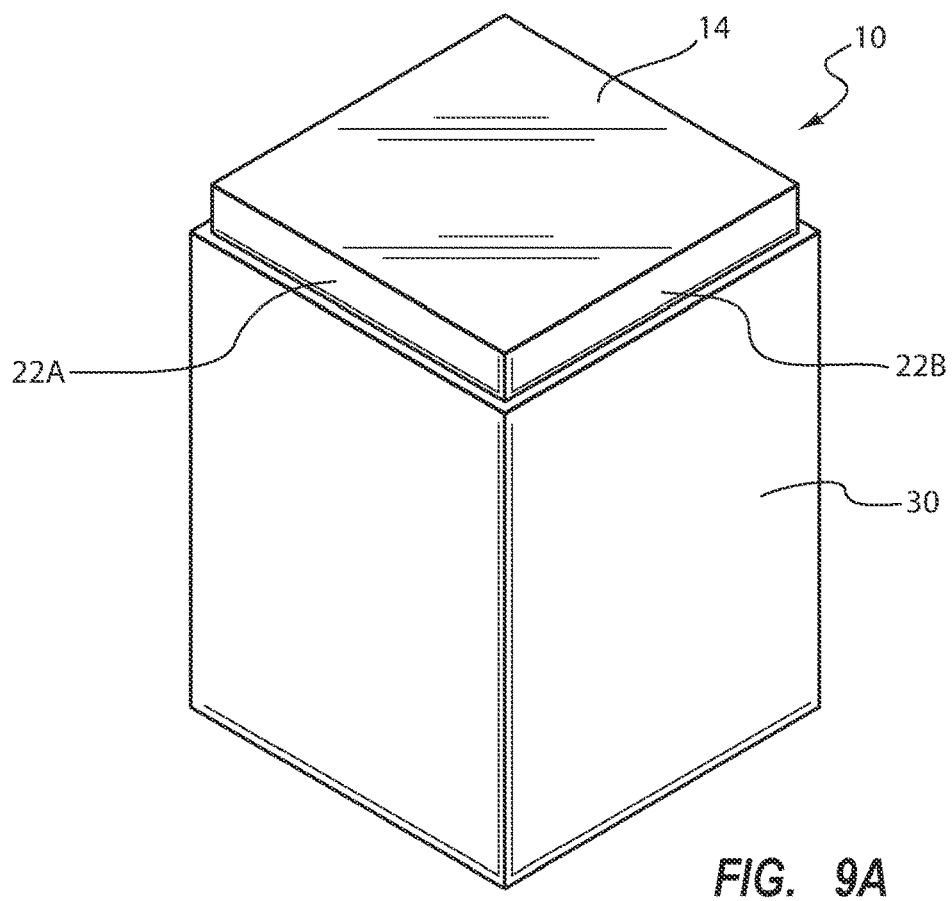
FIG. 9A is a perspective view of an exemplary superabrasive element that is partially surrounded by a protective layer.
Figure 9B:
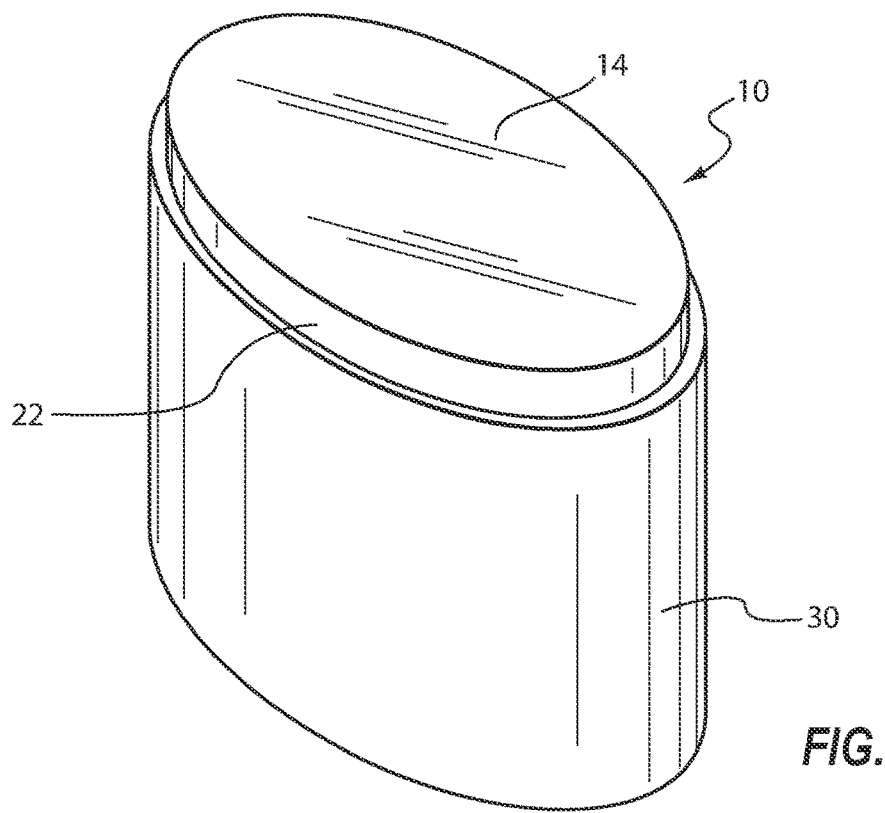
FIG. 9B is a perspective view of an exemplary superabrasive element that is partially surrounded by a protective layer.

FIGS. 9A and 9B illustrate protective layers formed over selected portions of exemplary superabrasive elements having various non-circular shapes according to various embodiments. Protective layer 30 may be formed over superabrasive elements having any suitable shape or geometry, without limitation. Forming protective layer 30 over superabrasive element 10 such that an intercalated hybrid layer (e.g., interface 31 in FIGS. 7A-7B) is formed may enable protective layer 30 to be formed closely around and securely affixed to superabrasive elements having non-circular peripheries.

FIG. 9A illustrates a protective layer 30 formed over an exemplary superabrasive element 10 having multiple faces. For example, as illustrated in FIG. 9A, superabrasive element 10 may comprise a six-sided element having six faces, including superabrasive side surfaces 22A and 22B. Protective layer 30 may closely adhere to outer portions of superabrasive element 10, including side surfaces 22A and 22B. Because, in this example, protective layer 30 is formed over superabrasive element 10 with an intercalated hybrid layer, protective layer 30 may be closely and securely affixed to superabrasive element 10, including angular portions of superabrasive element 10 between side surfaces 22A and 22B.

FIG. 9B illustrates a protective layer 30 formed over an exemplary superabrasive element 10 having a non-circular periphery, such as an elliptical, oval, or other suitable non-circular and/or uneven perimeter. Because protective layer 30 is formed over superabrasive element 10 with an intercalated hybrid layer, protective layer 30 may be closely and securely affixed to various surfaces of superabrasive element 10, including superabrasive side surface 22.

Figure 10A:
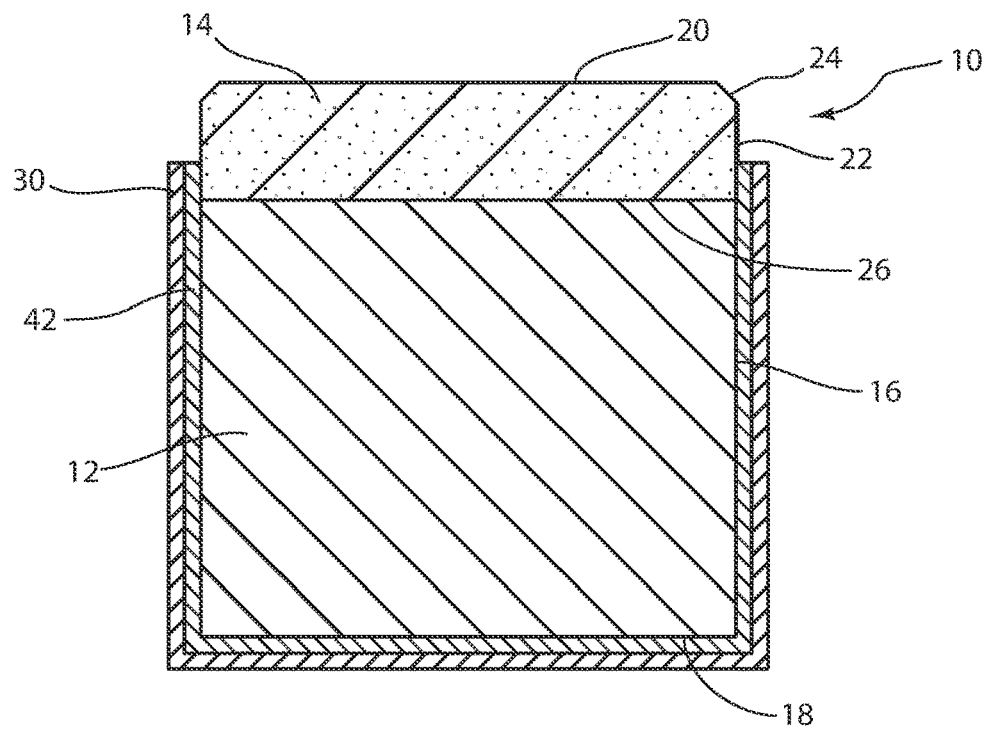
FIG. 10A is a cross-sectional side view of an exemplary superabrasive element that is partially surrounded by a protective layer and an intermediate layer according to at least one embodiment.
Figure 10B:
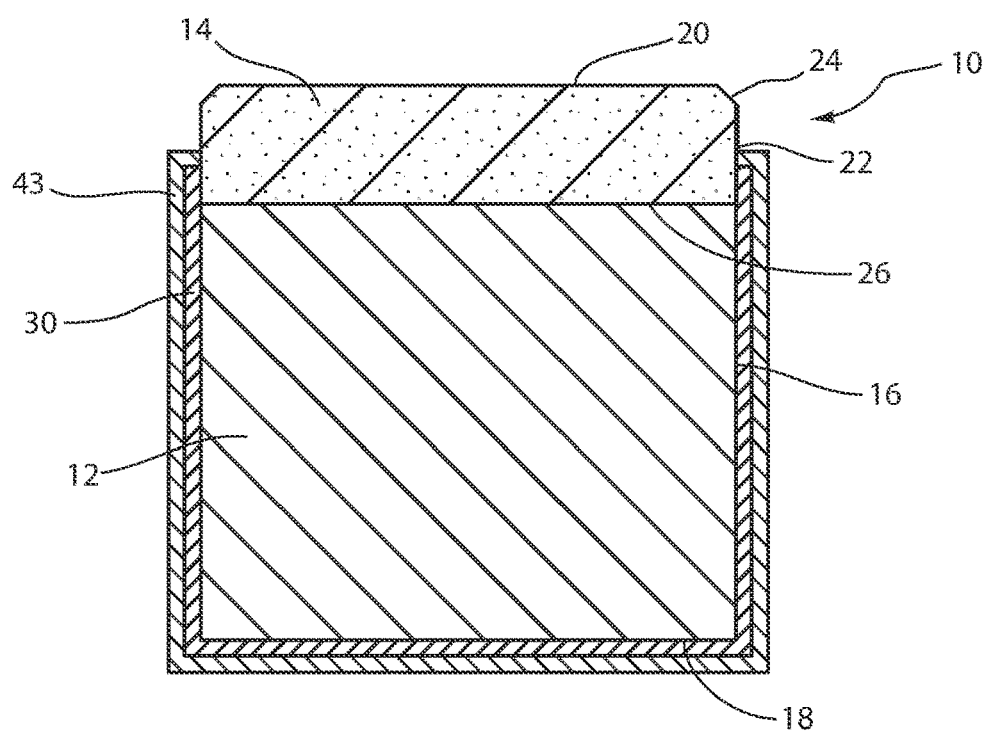
FIG. 10B is a cross-sectional side view of an exemplary superabrasive element that is partially surrounded by a protective layer and an outer layer according to at least one embodiment.

FIGS. 10A and 10B show exemplary superabrasive elements 10 that are partially surrounded by a protective layer 30 and an additional layer. In particular, FIG. 10A is a cross-sectional side view of an exemplary superabrasive element 10 that is partially surrounded by a protective layer 30 and an intermediate layer 42 according to at least one embodiment. As shown in FIG. 10A, intermediate layer 42 may comprise a layer of material disposed between at least a portion of protective layer 30 and superabrasive element 10. Similarly, FIG. 10B is a cross-sectional side view of an exemplary superabrasive element 10 that is partially surrounded by a protective layer 30 and an outer layer 43 according to at least one embodiment.

In at least one example, protective layer 30 may comprise a material capable of forming an intercalated hybrid layer with superabrasive element 10 and outer layer 43 may comprise a material having greater chemical resistance to a leaching solution than protective layer 30. As shown in FIG. 10B, outer layer 43 may comprise a layer of material surrounding at least a portion of protective layer 30 and superabrasive element 10. In various examples, both an intermediate layer 42 and an outer layer 43 may be formed around superabrasive element 10.

Intermediate layer 42 and/or outer layer 43 may comprise any suitable material or combination of materials, such as, for example, materials suitable for use in protective layer 30, as disclosed above in reference to FIGS. 5A-5D. Intermediate layer 42 and/or outer layer 43 may comprise any suitable metals, alloys, polymers, carbon allotropes, oxides, carbides, glass materials, ceramics, composites, and/or combination of the foregoing, without limitation. According to some examples, intermediate layer 42 and/or outer layer 43 may include, for example, a filler resin, sealant composition, thermosetting epoxy composition, and/or thermosetting silicone composition.

In some examples, intermediate layer 42 and/or outer layer 43 may comprise a material that is relatively impermeable and/or non-reactive with respect to an acidic, basic, and/or otherwise corrosive leaching solution. Intermediate layer 42 and/or outer layer 43 may also comprise a material suitable for adhering to and/or sealing at least a portion of superabrasive element 10. According to various examples, two or more intermediate layers may be disposed between protective layer 30 and superabrasive element 10 and/or two or more outer layers may be disposed surrounding protective layer 30.

Intermediate layer 42 and/or outer layer 43 may be formed over superabrasive element 10 and/or protective layer 30 using any suitable technique. For example, any suitable technique described herein for forming protective layer 30 on superabrasive element 10 may be used to form intermediate layer 42 and/or outer layer 43 on at least a portion of superabrasive element 10 and/or protective layer 30, without limitation. In at least one example, intermediate layer 42 may be formed on and/or affixed to superabrasive element 10 prior to forming protective layer 30 on intermediate layer 42 and/or superabrasive element 10. In various examples, outer layer 43 may be formed on and/or affixed to superabrasive element 10 and/or protective layer 30 after protective layer 30 has been formed over superabrasive element 10 and/or intermediate layer 42.

In some embodiments, intermediate layer 42 and/or outer layer 43 may be formed on and/or affixed to superabrasive element 10 at substantially the same time that protective layer 30 is formed on intermediate layer 42 and/or superabrasive element 10. For example, intermediate layer 42 may be formed from a resin material placed between superabrasive element 10 and a solid material used to form protective layer 30 (e.g., a metal cup surrounding at least a portion of superabrasive element 10). The resin mixture may then be exposed to elevated heat and/or pressure, causing the resin mixture to form an intermediate layer 42 that is formed over superabrasive element 10 and/or protective layer 30.

FIGS. 11A-11C illustrate an exemplary configuration for forming protective layer 30 and outer layer 33 on superabrasive element 10 (and sintering and/or leaching superabrasive element 10) according to at least one embodiment. As illustrated in FIGS. 11A-11C, protective layer 30 and outer layer 33 may be formed from sintering containers, such as sintering cans used in sintering superabrasive element 10. Protective layer 30 and outer layer 33 may be fused to superabrasive element 10 during sintering of superabrasive table 14. Outer layer 33 may be at least partially removed from protective layer 30 and/or superabrasive element 10 during leaching of at least a portion of superabrasive element 10.

FIG. 11A is a cross-sectional side view of the exemplary sintering configuration for forming a superabrasive element. Substrate 12 may be disposed adjacent to a particulate mixture 32, and substrate 12 and particulate mixture 32 may be surrounded by protective layer 30 and outer layer 33. In at least one embodiment, protective layer 30 and outer layer 33 may comprise a sintering container configured to surround and hold substrate 12 and particulate mixture 32 during sintering.

Protective layer 30 and/or outer layer 33 may comprise any material or combination of materials suitable for encasing substrate 12 and particulate mixture 32 during sintering. Protective layer 30 and/or outer layer 33 may comprise a material or combination of materials capable of withstanding high temperatures and/or pressures during HPHT sintering. For example, protective layer 30 and/or outer layer 33 may comprise one or more refractory metals, including, for example, niobium, tantalum, molybdenum, tungsten, rhenium, chromium, vanadium, hafnium, and/or zirconium. Protective layer 30 and/or outer layer 33 may also comprise any other metallic and/or nonmetallic material suitable for encasing substrate 12 and/or particulate mixture 32 during sintering.

In at least one embodiment, protective layer 30 may comprise a material that is substantially inert and/or otherwise resistant to acids, bases, and/or other reactive compounds present in a leaching solution used to leach superabrasive element 10. For example, protective layer 30 may comprise niobium, which may be substantially impervious to various leaching solutions. Additionally, outer layer 33 may comprise a material that is soluble in certain leaching solutions and gas mixtures. For example, outer layer 33 may comprise zirconium, which may be dissolved when exposed to leaching solutions, such as acidic leaching solutions.

Protective layer 30 and outer layer 33 may be disposed around superabrasive element 10 in any suitable configuration. For example, as illustrated in FIG. 11A, protective layer 30 may directly contact substrate 12 and/or particulate mixture 32. Outer layer 33 may be disposed over an exposed portion of particulate mixture 32. As illustrated in FIG. 11A, outer layer 33 may also overlap at least a portion of protective layer 30. For example, protective layer 30 and outer layer 33 may comprise sintering cans that are disposed overlapping each other so that substrate 12 and particulate mixture 32 are substantially encased. In certain embodiments, outer layer 33 may comprise a cover that covers particulate mixture 32 but does not overlap protective layer 30 (e.g., cover 34 in FIG. 6A).

FIG. 11B is a cross-sectional side view of the exemplary sintering configuration illustrated in FIG. 11A following sintering of particulate mixture 32 to form superabrasive table 14 and following subsequent leaching of superabrasive table 14. According to at least one embodiment, following HPHT sintering, at least a portion of protective layer 30 may be bonded and/or otherwise affixed to superabrasive table 14 and/or substrate 12 at interface 31.

According to at least one embodiment, following sintering, superabrasive element 10, which is surrounded by protective layer 30 and outer layer 33, may be immersed in a suitable leaching solution. The leaching solution may dissolve at least a portion of outer layer 33 so that at least a portion of superabrasive table 14, such as superabrasive face 20, is exposed to the leaching solution. After dissolution of outer layer 33, protective layer 30 may remain affixed to both substrate 12 and at least a portion of superabrasive table 14, as shown in FIG. 11B. In at least one example, following dissolution of outer layer 33, superabrasive element 10 may remain in the leaching solution for a specified time or until superabrasive table 14 has been leached to a desired degree relative to superabrasive face 20.

FIG. 11C is a cross-sectional side view of the exemplary sintering configuration illustrated in FIGS. 11A and 11B after protective layer 30 has been removed from a portion of superabrasive element 10. As illustrated in FIG. 11C, following dissolution of outer 33 and at least partial leaching of superabrasive table 14, protective layer 30 may be removed from a portion of superabrasive side surface 22 of superabrasive table 14 using any suitable technique, such a grinding. Superabrasive table 14 may then be exposed to a leaching solution for a desired time or until superabrasive table 14 has been leached to a desired depth relative to superabrasive face 20 and/or superabrasive side surface 22. After superabrasive element 10 has been leached, the remaining portion of protective layer 30 may be removed from superabrasive element 10.

Figure 13A:
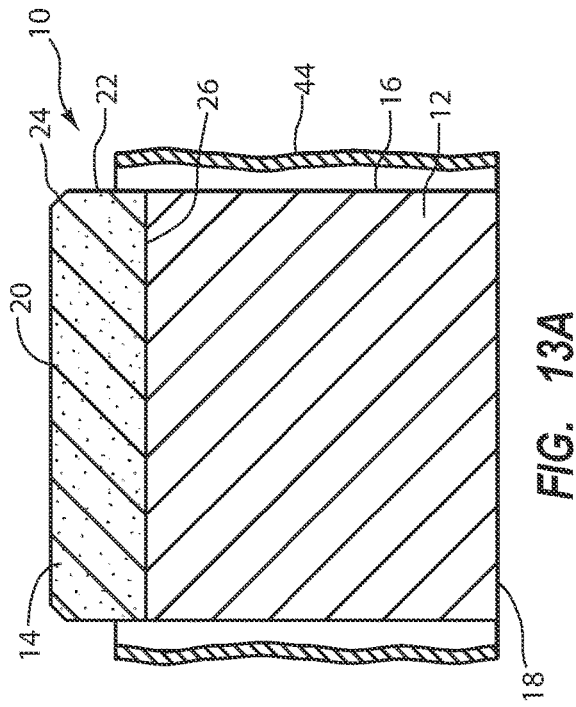
FIG. 13A is a cross-sectional side view of the superabrasive element illustrated in FIG. 11 partially surrounded by the heat-shrink layer.
Figure 13B:
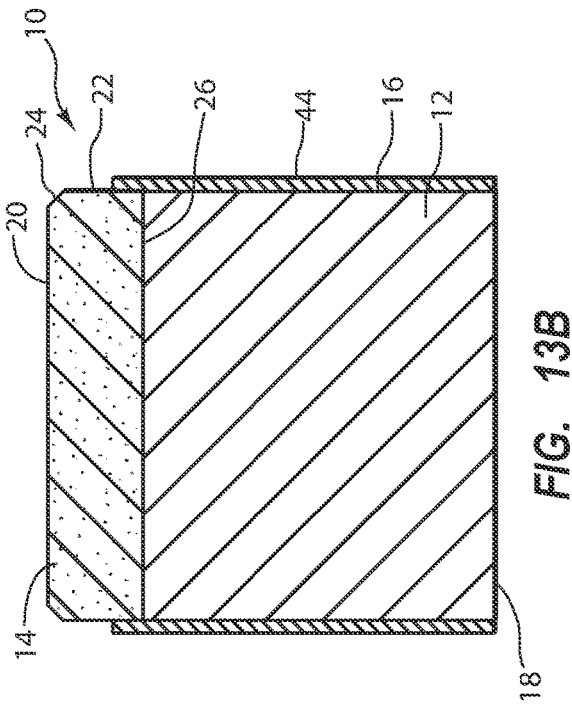
FIG. 13B is a cross-sectional side view of the superabrasive element illustrated in FIG. 11 partially encased by the heat-shrink layer.
Figure 12:
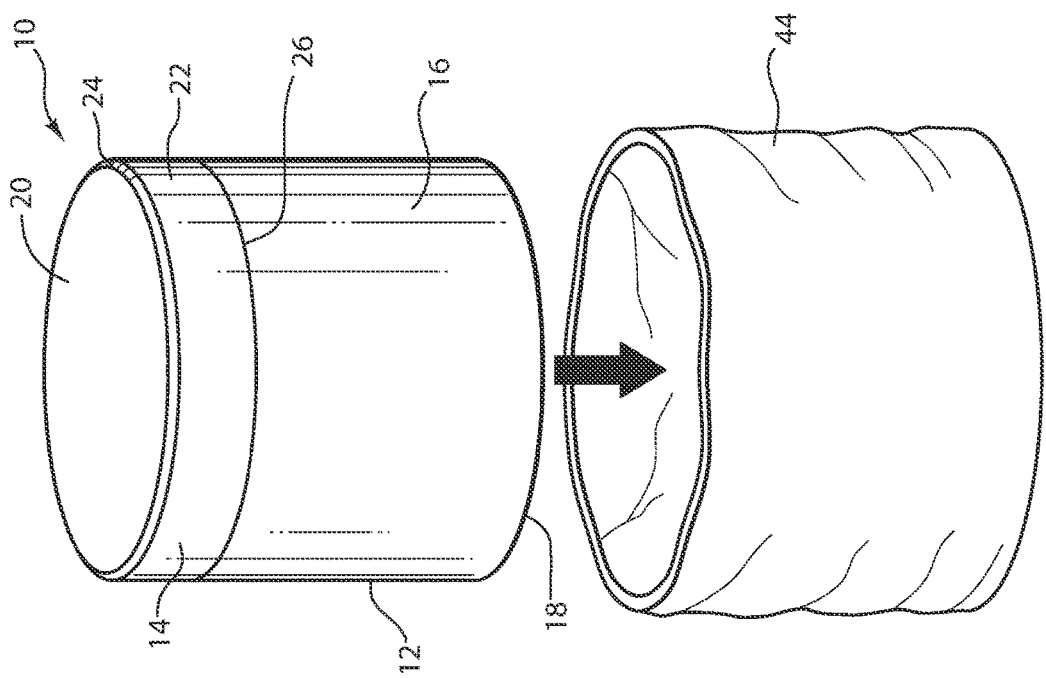
FIG. 12 is a perspective view of an exemplary superabrasive element and a heat-shrink layer according to at least one embodiment.

FIGS. 12, 13A, and 13B illustrate an exemplary technique for forming a protective layer 44 over a superabrasive element 10 according to at least one embodiment. FIG. 12 is a perspective view of an exemplary superabrasive element 10 and a protective layer 44 comprising a heat-shrink material. FIG. 13A is a cross-sectional side view of the superabrasive element 10 and the protective layer 44 illustrated in FIG. 12.

As shown in FIGS. 12 and 13A, protective layer 44 may comprise a sleeve or tube sized and configured to surround at least a portion of superabrasive element 10, including at least a portion of substrate 12 and/or superabrasive table 14. In various embodiments, protective layer 44 may comprise a heat-shrink sleeve or tube formed of a thermoplastic polymer material. Examples of suitable thermoplastic materials include, without limitation, polyolefin, fluoropolymer, PVC, neoprene, silicone elastomer, and/or synthetic rubber materials. Suitable fluoropolymers may include, for example, PTFE, fluorinated ethylene propylene, and/or PVDF. In at least one example, protective layer 44 may comprise a TEFLON (DuPont, Wilmington, DE) PTFE material.

In some embodiments, protective layer 44 may be configured to be formed over at least a portion of superabrasive element 10 following exposure to heat and/or pressure. For example, when protective layer 44 is exposed to an elevated temperature, protective layer 44 may shrink and/or contract, causing protective layer 44 to more closely surround superabrasive element 10, affixing protective layer 44 to superabrasive element 10. In some examples, when protective layer 44 is heated above a threshold temperature, monomers and/or polymers within protective layer 44 may undergo a polymerization and/or crystallization process, causing protective layer 44 to increase in density, thereby shrinking protective layer 44. In at least one embodiment, heat may be applied to protective layer 44 using any suitable heat source, including, for example, an oven and/or a hot air gun.

FIG. 13B is a cross-sectional side view of the superabrasive element 10 partially encased by the protective layer 44 illustrated in FIGS. 12 and 13A. According to at least one embodiment, protective layer 44 may conform to surface irregularities on at least a surface portion of superabrasive element 10, frictionally securing protective layer 44 to superabrasive element 10. For example, portions of protective layer 44 may closely surround protrusions on superabrasive element 10 and/or may at least partially fill cavities defined within superabrasive element 10. In some examples, an intercalated hybrid layer may be formed at an interface between protective layer 44 and superabrasive element 10 (e.g., interface 31 illustrated in FIGS. 7A and 7B). In various embodiments, protective layer 44 may be heated to a temperature near and/or above a melting point of protective layer 44 such that protective layer 44 melts and conforms to at least a portion of superabrasive element 10.

Figure 14:
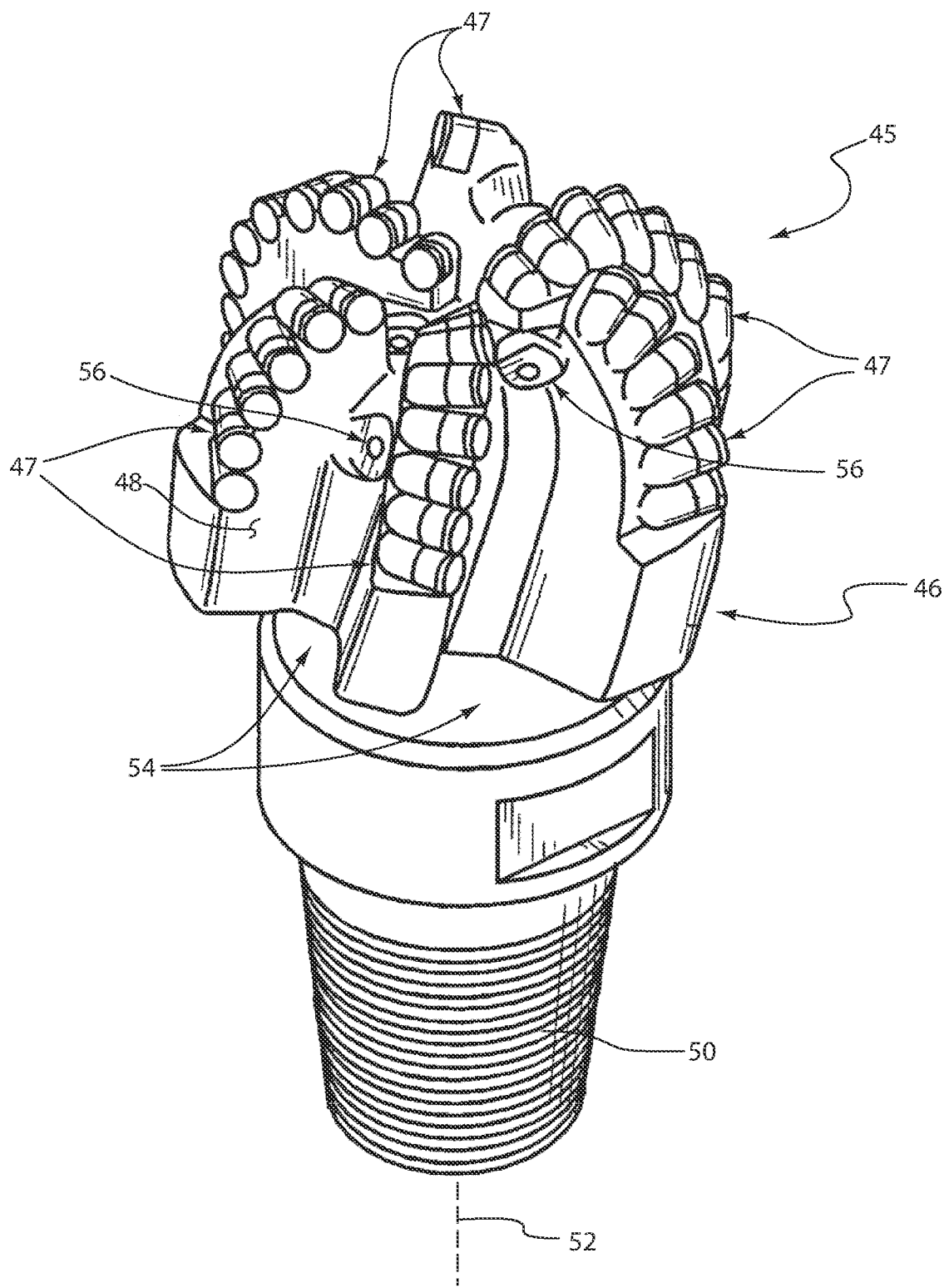
FIG. 14 is a perspective view of an exemplary drill bit according to at least one embodiment.
Figure 15:
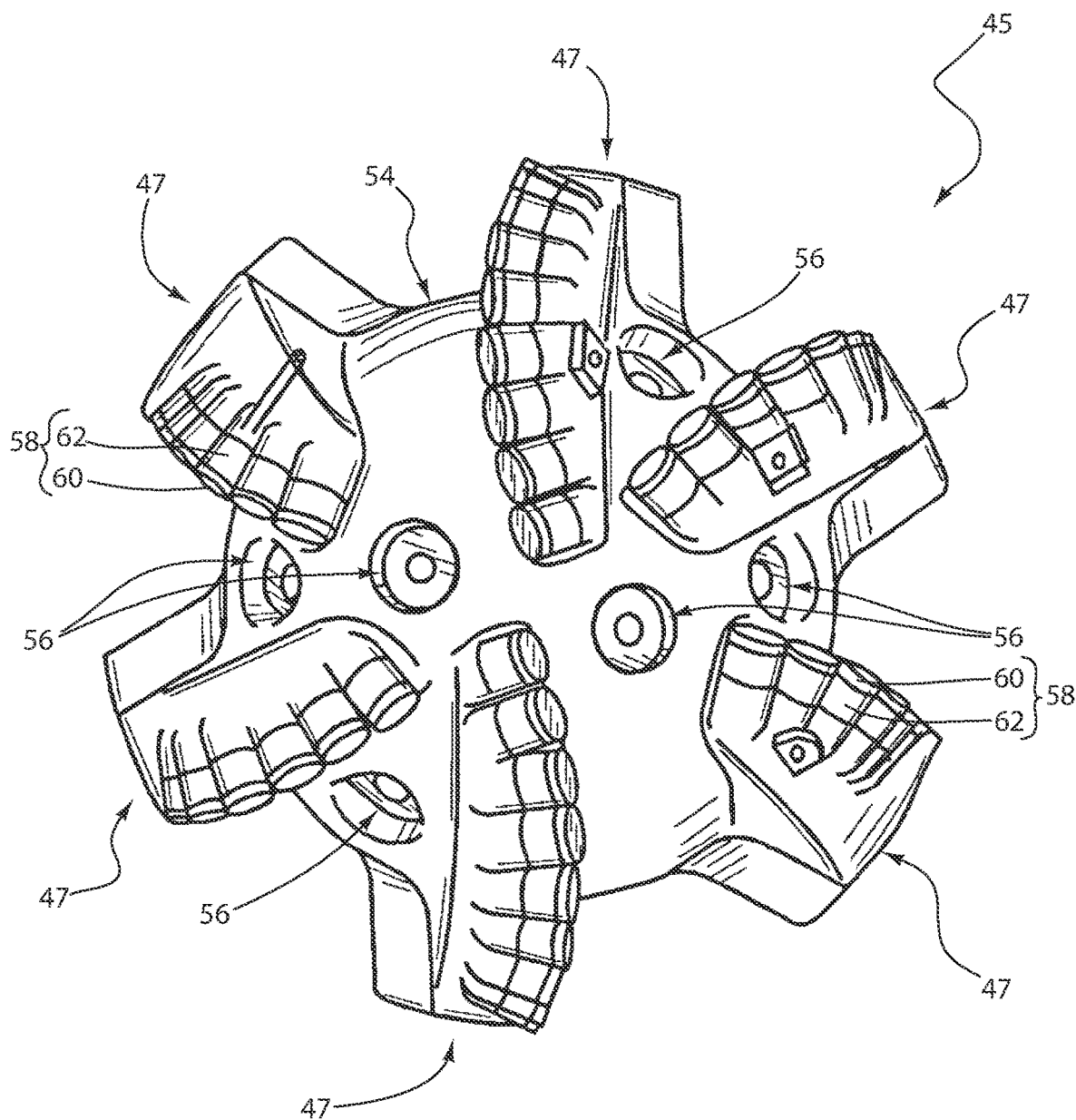
FIG. 15 is a top view of the exemplary drill bit illustrated in FIG. 14.

FIGS. 14 and 15 are perspective and top views, respectively, of an exemplary drill bit 45 according to at least one embodiment. Drill bit 45 may represent any type or form of earth-boring or drilling tool, including, for example, a rotary drill bit. As illustrated in FIGS. 14 and 15, drill bit 45 may comprise a bit body 46 having a longitudinal axis 52. Bit body 46 may define a leading end structure for drilling into a subterranean formation by rotating bit body 46 about longitudinal axis 52 and applying weight to bit body 46. Bit body 46 may include radially and longitudinally extending blades 47 with leading faces 48 and a threaded pin connection 50 for connecting bit body 46 to a drill string.

At least one cutting element 58 may be coupled to bit body 46. For example, as shown in FIG. 15, a plurality of cutting elements 58 may be coupled to blades 47. Cutting elements 58 may comprise any suitable superabrasive elements, without limitation. In at least one embodiment, cutting elements 58 may be configured according to previously described superabrasive element 10 and/or superabrasive disc 28. In some embodiments, each cutting element 58 may include a superabrasive table 60, such as a PCD table, bonded to a substrate 62.

Circumferentially adjacent blades 47 may define so-called junk slots 54 therebetween. Junk slots 54 may be configured to channel debris, such as rock or formation cuttings, away from cutting elements 58 during drilling. Drill bit 45 may also include a plurality of nozzle cavities 56 for communicating drilling fluid from the interior of drill bit 45 to cutting elements 58.

FIGS. 14 and 15 depict an example of a drill bit 45 that employs at least one cutting element 58 comprising a superabrasive table 60 fabricated and structured in accordance with the disclosed embodiments, without limitation. Drill bit 45 may additionally represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation.

The superabrasive elements and discs disclosed herein may also be utilized in applications other than cutting technology. For example, embodiments of superabrasive elements and/or discs disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements and/or discs, as disclosed herein, may be employed in medical device applications, including, without limitation, hip joints, back joints, or any other suitable medical joints. Thus, superabrasive elements and discs, as disclosed herein, may be employed in any suitable article of manufacture that includes a superabrasive element, disc, or layer. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. For an example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements as disclosed herein.

Figure 16:
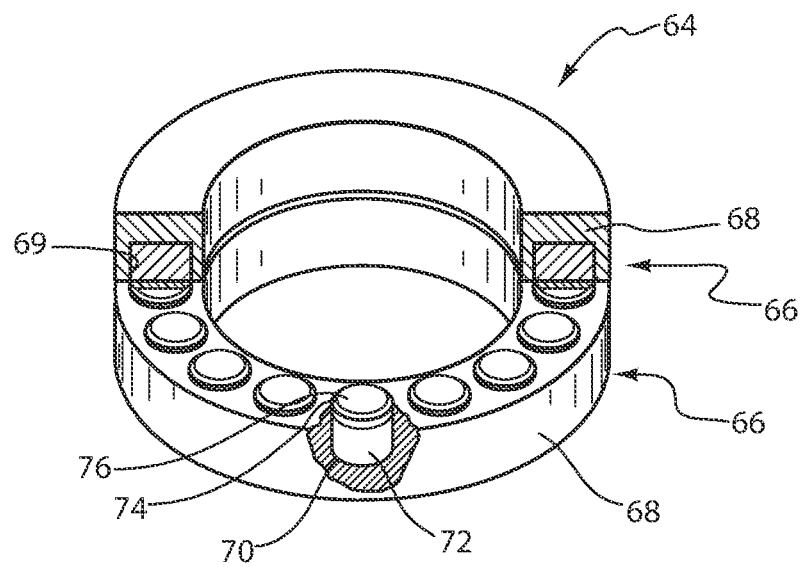
FIG. 16 is a partial cut-away perspective view of an exemplary thrust bearing apparatus according to at least one embodiment.

FIG. 16 is partial cross-sectional perspective view of an exemplary thrust-bearing apparatus 64 according to at least one embodiment. Thrust-bearing apparatus 64 may utilize any of the disclosed superabrasive element embodiments as bearing elements 70. Thrust-bearing apparatus 64 may also include bearing assemblies 66. Each bearing assembly 66 may include a support ring 68 fabricated from a material, such as steel, stainless steel, or any other suitable material, without limitation.

Each support ring 68 may include a plurality of recesses 69 configured to receive corresponding bearing elements 70. Each bearing element 70 may be mounted to a corresponding support ring 68 within a corresponding recess 69 by brazing, welding, press-fitting, using fasteners, or any another suitable mounting technique, without limitation. In at least one embodiment, one or more of bearing elements 70 may be configured according to previously described superabrasive element 10 and/or superabrasive disc 28. For example, each bearing element 70 may include a substrate 72 and a superabrasive table 74 comprising a PCD material. Each superabrasive table 74 may form a bearing surface 76.

Bearing surfaces 76 of one bearing assembly 66 may bear against opposing bearing surfaces 76 of a corresponding bearing assembly 66 in thrust-bearing apparatus 64, as illustrated in FIG. 16. For example, a first bearing assembly 66 of thrust-bearing apparatus 64 may be termed a "rotor." The rotor may be operably coupled to a rotational shaft. A second bearing assembly 66 of thrust-bearing apparatus 64 may be held substantially stationary relative to the first bearing assembly 66 and may be termed a "stator."

Figure 17:
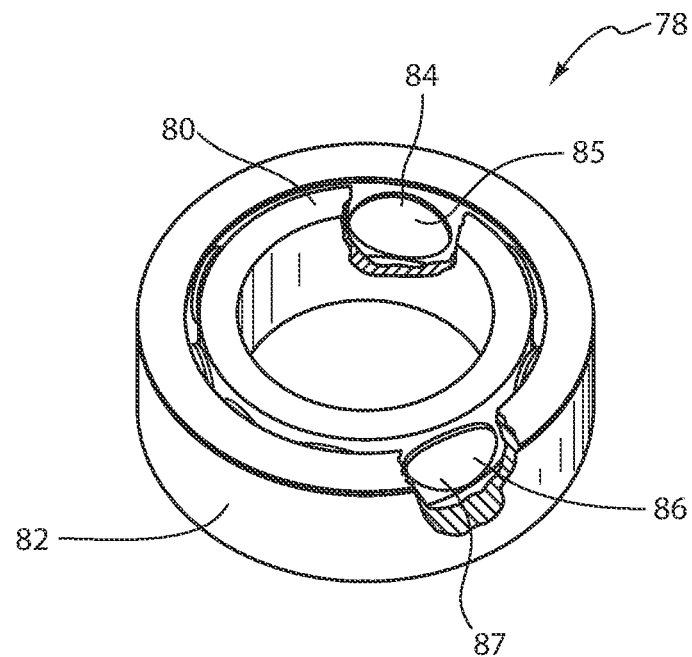
FIG. 17 is a partial cut-away perspective view of an exemplary radial bearing apparatus according to at least one embodiment.

FIG. 17 is a perspective view of a radial bearing apparatus 78 according to another embodiment. Radial bearing apparatus 78 may utilize any of the disclosed superabrasive element embodiments as bearing elements 84 and 86. Radial bearing apparatus 78 may include an inner race 80 positioned generally within an outer race 82. Inner race 80 may include a plurality of bearing elements 84 affixed thereto, and outer race 82 may include a plurality of corresponding bearing elements 86 affixed thereto. One or more of bearing elements 84 and 86 may be configured in accordance with any of the superabrasive element embodiments disclosed herein.

Inner race 80 may be positioned generally within outer race 82. Thus, inner race 80 and outer race 82 may be configured such that bearing surfaces 85 defined by bearing elements 84 and bearing surfaces 87 defined by bearing elements 86 may at least partially contact one another and move relative to one another as inner race 80 and outer race 82 rotate relative to each other. According to various embodiments, thrust-bearing apparatus 64 and/or radial bearing apparatus 78 may be incorporated into a subterranean drilling system.

Figure 18:
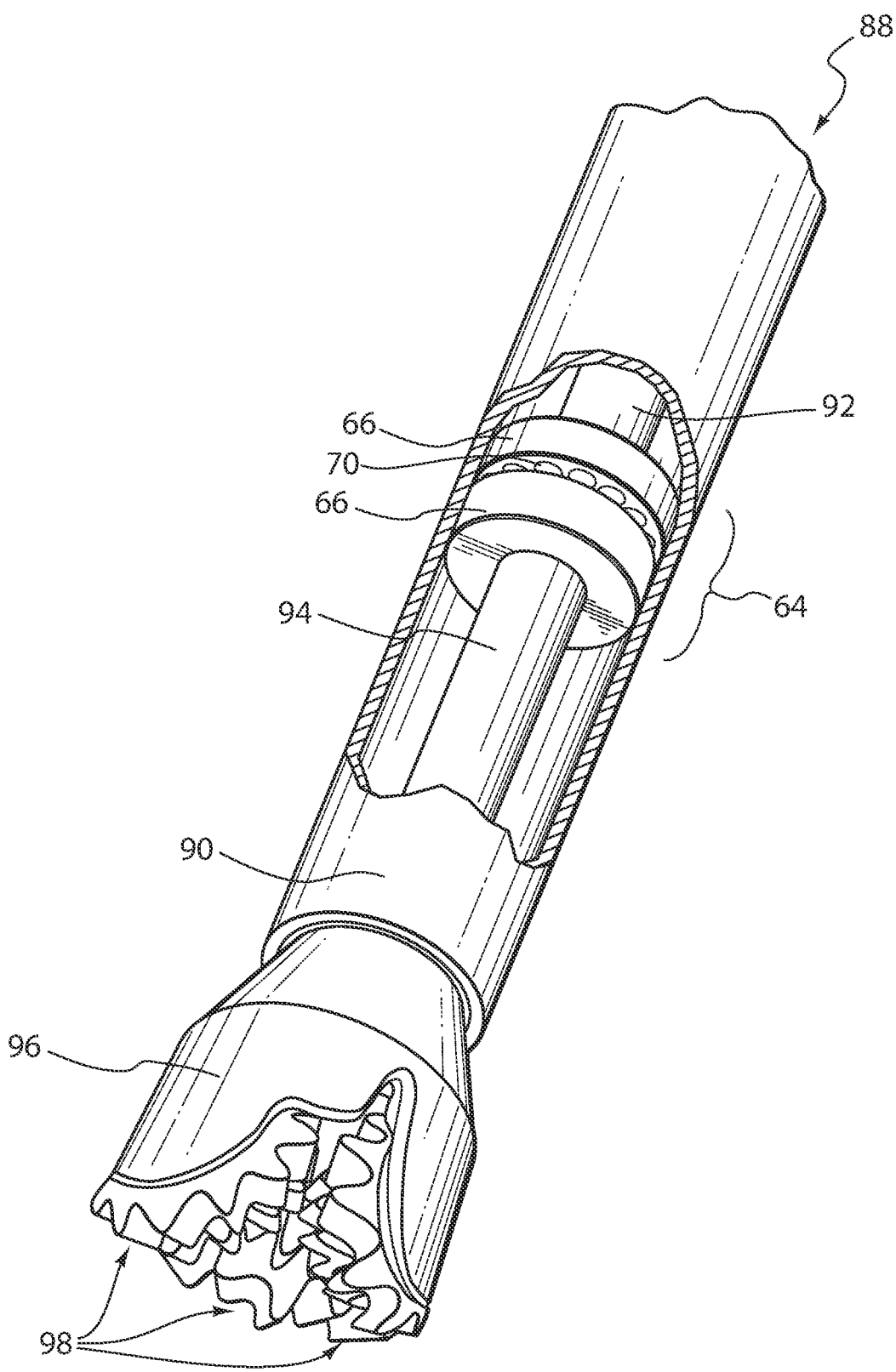
FIG. 18 is a partial cut-away perspective view of an exemplary subterranean drilling system according to at least one embodiment.

FIG. 18 is a partial cross-sectional perspective view of an exemplary subterranean drilling system 88 that includes a thrust-bearing apparatus 64, as shown in FIG. 16, according to at least one embodiment. The subterranean drilling system 88 may include a housing 90 enclosing a downhole drilling motor 92 (i.e., a motor, turbine, or any other suitable device capable of rotating an output shaft, without limitation) that is operably connected to an output shaft 94.

The thrust-bearing apparatus 64 shown in FIG. 18 may be operably coupled to downhole drilling motor 92. A rotary drill bit 96, such as a rotary drill bit configured to engage a subterranean formation and drill a borehole, may be connected to output shaft 94. As illustrated in FIG. 10, rotary drill bit 96 may be a roller cone bit comprising a plurality of roller cones 98. According to additional embodiments, rotary drill bit 96 may comprise any suitable type of rotary drill bit, such as, for example, a so-called fixed-cutter drill bit. As a borehole is drilled using rotary drill bit 96, pipe sections may be connected to subterranean drilling system 88 to form a drill string capable of progressively drilling the borehole to a greater depth within a subterranean formation.

A first thrust-bearing assembly 66 in thrust-bearing apparatus 64 may be configured as a rotor that is attached to output shaft 94 and a second thrust-bearing assembly 66 in thrust-bearing apparatus 64 may be configured as a stator. During a drilling operation using subterranean drilling system 88, the rotor may rotate in conjunction with output shaft 94 and the stator may remain substantially stationary relative to the rotor.

According to various embodiments, drilling fluid may be circulated through downhole drilling motor 92 to generate torque and effect rotation of output shaft 94 and rotary drill bit 96 attached thereto so that a borehole may be drilled. A portion of the drilling fluid may also be used to lubricate opposing bearing surfaces of bearing elements 70 on thrust-bearing assemblies 66.

Figure 19:
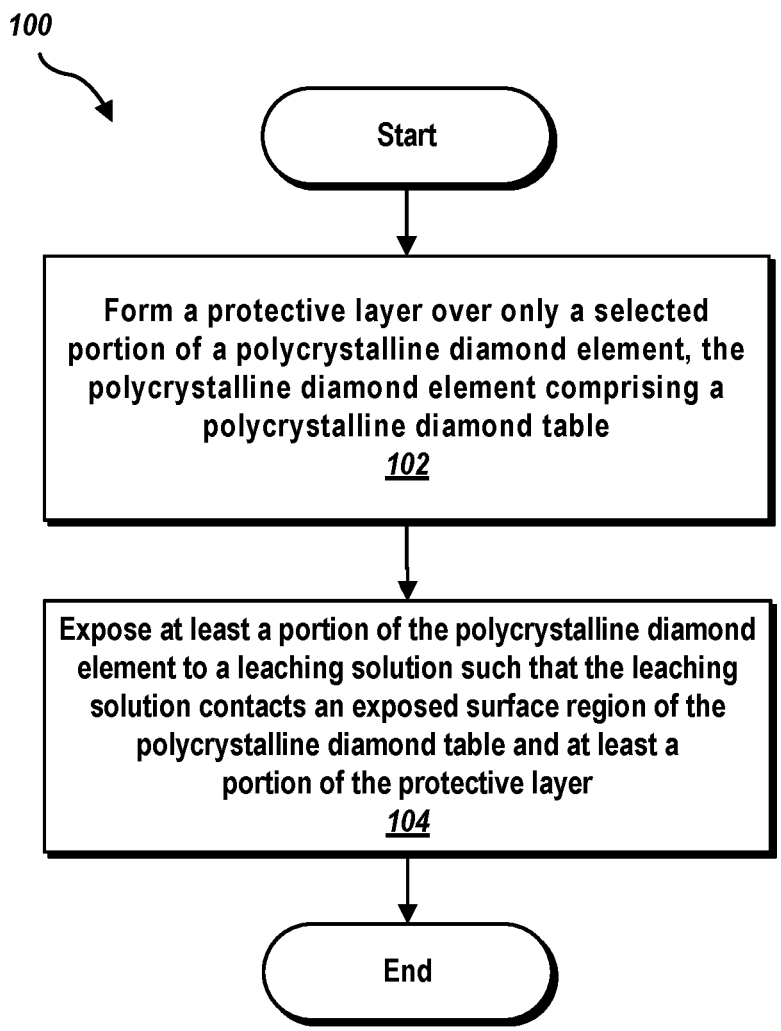
FIG. 19 is a flow diagram of an exemplary method of processing a polycrystalline diamond element according to at least one embodiment.

FIG. 19 illustrates an exemplary method 100 for processing a polycrystalline diamond element according to at least one embodiment. As shown in FIG. 19, a protective layer may be formed over only a selected portion of a polycrystalline diamond element (process 102). The polycrystalline diamond element may comprise a polycrystalline diamond table (e.g., superabrasive table 14 of superabrasive element 10 and superabrasive disc 28 illustrated in FIGS. 1 and 2, respectively). The polycrystalline diamond element may also comprise a substrate bonded to the polycrystalline diamond table. For example, a polycrystalline diamond table may be bonded to a tungsten carbide substrate (e.g., superabrasive element 10 illustrated in FIG. 1).

The selected portion of the polycrystalline diamond element may comprise at least a portion of a surface of the substrate and at least a portion of a surface of the polycrystalline diamond table. For example, the protective layer may be affixed to a selected portion of the polycrystalline diamond element that includes the substrate and a portion of the polycrystalline diamond table near the substrate (e.g., superabrasive element 10 surrounded by protective layer 30 illustrated in FIGS. 5A-5C). The protective layer may comprise any suitable material, including metals, alloys, polymers, carbon allotropes, oxides, carbides, glass materials, ceramics, composites, and/or any combination of the foregoing, without limitation.

The protective layer may be affixed to the polycrystalline element in any suitable manner, without limitation. In some examples, the protective layer may be affixed or fused to the polycrystalline diamond element at an interface between the protective layer and the polycrystalline diamond element (e.g., interface 31 illustrated in FIGS. 7A and 7B). According to at least one embodiment, the interface between the protective layer and the polycrystalline diamond element may include an intercalated hybrid layer comprising portions of the protective layer and portions of the polycrystalline diamond element. In some embodiments, an outer layer may be formed on at least a portion of an outer surface of the protective layer (e.g., outer layer 43 illustrated in FIG. 10).

At least a portion of the polycrystalline diamond element may be exposed to a leaching solution such that the leaching solution contacts an exposed surface region of the polycrystalline diamond table and at least a portion of the protective layer (process 104). The polycrystalline diamond material may be exposed to the leaching solution in any suitable manner, such as, for example, by submerging at least a portion of the polycrystalline diamond material in the leaching solution. The protective layer may be substantially impermeable to the leaching solution. In some examples, the protective layer may comprise a substantially inert material or a material that is otherwise substantially non-reactive with respect to the leaching solution.

In some embodiments, an edge portion of the polycrystalline diamond table may be chamfered. For example, the edge portion of the polycrystalline diamond table may be chamfered using a grinder after the protective layer is affixed to the polycrystalline diamond element and before the polycrystalline diamond element is exposed to the leaching solution. In at least one embodiment, a reference mark may be placed on a portion of the polycrystalline diamond element. A centerless grinder (e.g., a centerless CNC grinding machine) may then grind the edge portion of the polycrystalline diamond table utilizing the reference mark to locate the edge portion. The reference mark may enable the centerless grinder to form a relatively even and consistent chamfered and/or rounded edge around the polycrystalline diamond table.

After the polycrystalline diamond element has been leached, the protective layer may be removed from at least a portion of the selected portion of the polycrystalline diamond element. For example, the protective layer may be substantially removed from the polycrystalline diamond table and the substrate using any suitable technique, such as, for example, lapping and/or grinding. In some embodiments, following removal of the protective layer, one or more surfaces of the polycrystalline diamond table and/or the substrate may be processed to form a desired surface texture and/or finish using any suitable technique, including, for example, lapping, grinding, and/or otherwise physically and/or chemically treating the one or more surfaces.

Figure 20:
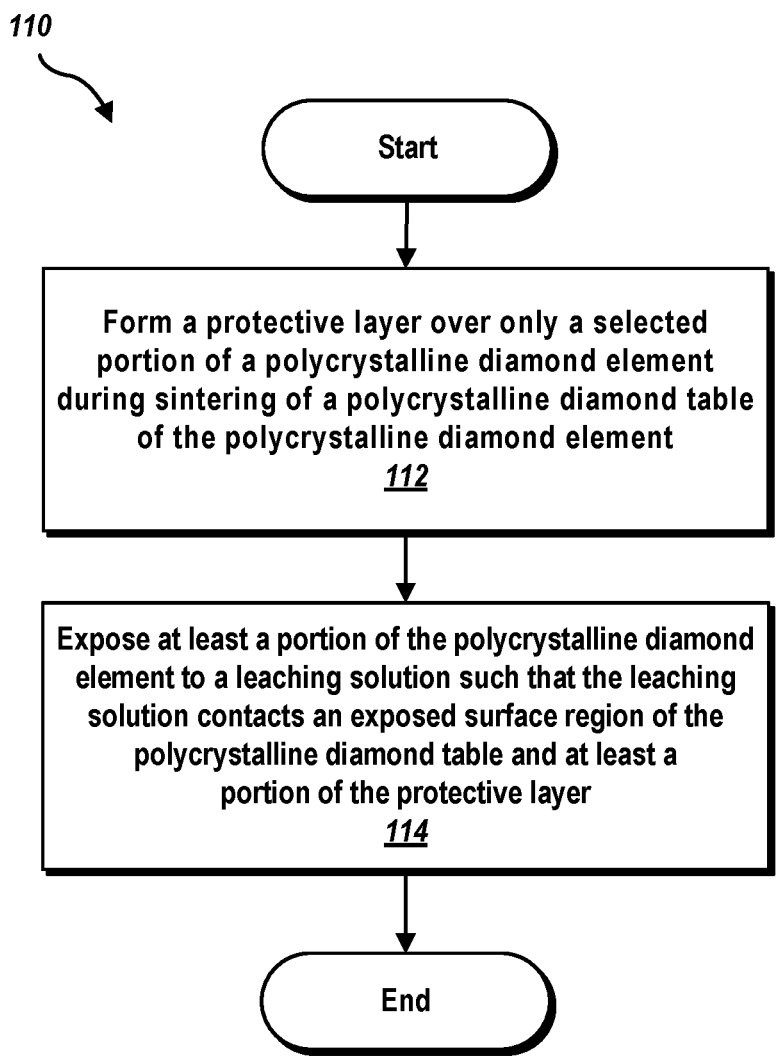
FIG. 20 is a flow diagram of an exemplary method of manufacturing a polycrystalline diamond element according to at least one embodiment.

FIG. 20 illustrates an exemplary method 110 for manufacturing a polycrystalline diamond element according to at least one embodiment. As shown in FIG. 20, the method may comprise forming a protective layer over only a selected portion of a polycrystalline diamond element during sintering of a polycrystalline diamond table of the polycrystalline diamond element (process 112).

In at least one embodiment, a particulate mixture comprising diamond particles may be disposed adjacent to a substrate and the protective layer (e.g., particulate mixture 32 disposed adjacent to substrate 12 and protective layer 30, as illustrated in FIG. 6A). The particulate mixture may then be HPHT sintered to form the polycrystalline diamond table such that the protective layer is formed on at least a portion of a surface of the polycrystalline diamond table (e.g., superabrasive table 14 disposed adjacent to substrate 12 and protective layer 30, as illustrated in FIGS. 6B and 6C). At least a portion of the polycrystalline diamond element may then be exposed to a leaching solution such that the leaching solution contacts an exposed surface region of the polycrystalline diamond table and at least a portion of the protective layer (process 114).

Figure 21:
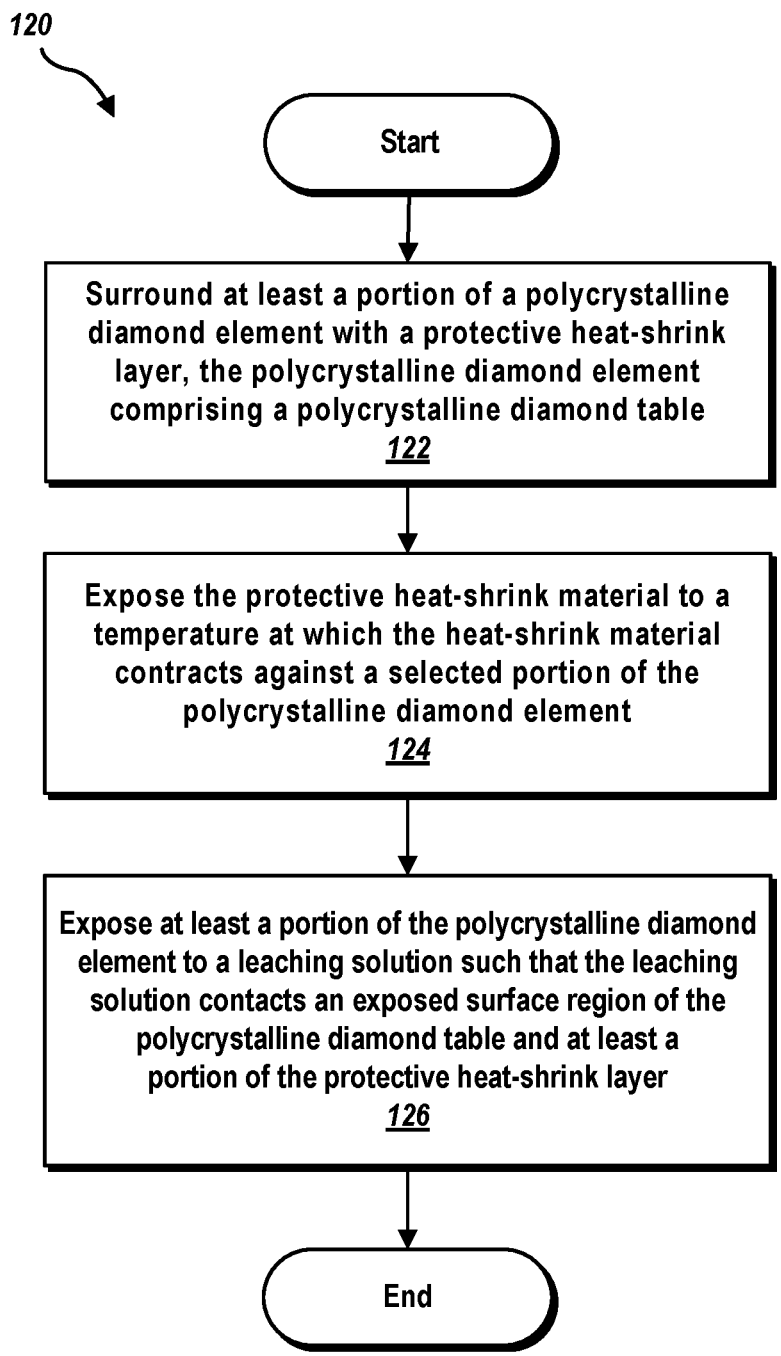
FIG. 21 is a flow diagram of an exemplary method of processing a polycrystalline diamond element according to at least one embodiment.

FIG. 21 illustrates an exemplary method 120 for processing a polycrystalline diamond element according to various embodiments. As shown in FIG. 21, at least a portion of a polycrystalline diamond element may be surrounded with a protective heat-shrink layer (e.g., protective layer 44 illustrated in FIG. 12) (process 122). The protective heat-shrink material may be exposed to a temperature at which the heat-shrink material contracts against a selected portion of the polycrystalline diamond element (process 124). At least a portion of the polycrystalline diamond element may then be exposed to a leaching solution such that the leaching solution contacts an exposed surface region of the polycrystalline diamond table and at least a portion of the protective layer (process 126).

Figure 22:
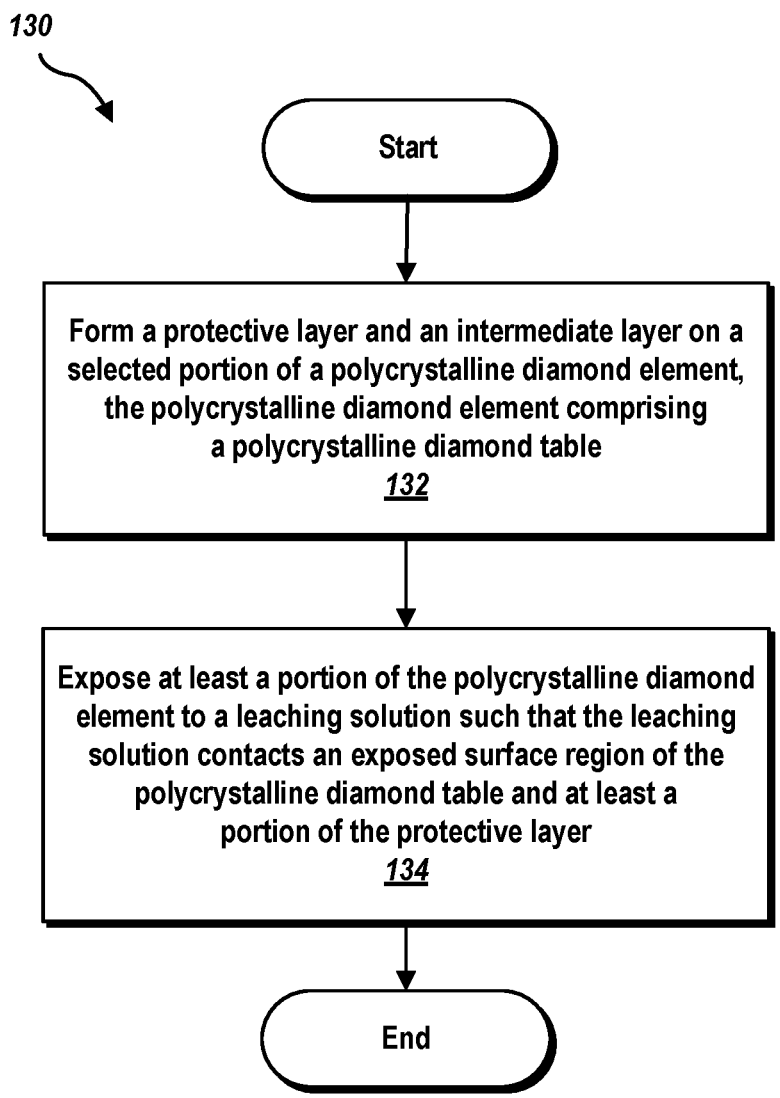
FIG. 22 is a flow diagram of an exemplary method of processing a polycrystalline diamond element according to at least one embodiment.

FIG. 22 illustrates an exemplary method 130 for processing a polycrystalline diamond element according to various embodiments. As shown in FIG. 22, a protective layer and an intermediate layer (e.g., intermediate layer 42 illustrated in FIG. 10A) may be formed on a selected portion of a polycrystalline diamond element (process 132). At least a portion of the polycrystalline diamond element may then be exposed to a leaching solution such that the leaching solution contacts an exposed surface region of the polycrystalline diamond table and at least a portion of the protective layer (process 134).

Example 1

A tungsten carbide substrate and a particulate diamond mixture were placed adjacent to each other in a niobium can. A niobium cap was crimped onto the niobium can. The niobium can containing the substrate and the particulate diamond mixture was then placed in a HPHT press and the particulate diamond mixture was sintered to form a PCD cutting element comprising a PCD table.

Following the sintering process, the PCD table was observed to be fused to the tungsten carbide substrate and the niobium can was observed to be fused to both the tungsten carbide substrate and the PCD table. A portion of the niobium can was removed from a front face of the PCD table through lapping. Additionally, a portion of the niobium can was removed from a side portion of the PCD table adjacent to the front face, leaving the entire tungsten carbide substrate and a portion of the PCD table adjacent to the substrate encased by the niobium can.

The PCD cutting element encased by the niobium can was then placed in a 1.5 M nitric acid solution to be leached. The PCD cutting element was exposed to the solution for 24 hours at a temperature of 110° C. The PCD cutting element was removed from the solution. Following leaching, there was no evidence of dissolution of the substrate or other damage to the substrate of the leached PCD cutting element.

Example 2

A niobium can was tightly swaged around a PCD cutting element having a tungsten carbide substrate and a chamfered PCD table. The niobium can encased the entire substrate and a portion of the PCD table such that the front surface and the chamfered region of the PCD table were exposed.

The PCD cutting element encased by the niobium can was then leached in a 1.5 M nitric acid solution for 24 hours at a temperature of 110° C., as detailed in Example 1. Following leaching, there was no evidence of dissolution of the substrate or other damage to the substrate of the leached PCD cutting element.

Example 3

A niobium can was tightly swaged around a PCD cutting element having a tungsten carbide substrate and a chamfered PCD table, as detailed in Example 2. The PCD cutting element encased by the niobium can was exposed to a temperature of 180° C. and a vacuum pressure of 20 inHg in a vacuum oven for about 12 hours.

The PCD cutting element encased by the niobium can was then leached in a 1.5 M nitric acid solution for 24 hours at a temperature of 110° C., as detailed in Example 1. Following leaching, there was no evidence of dissolution of the substrate or other damage to the substrate of the leached PCD cutting element.

Example 4

A niobium can was placed around a PCD cutting element having a tungsten carbide substrate and a chamfered PCD table. An EPOMET epoxy resin material was disposed in the can between the PCD cutting element and the niobium can. The can was tightly swaged around the PCD cutting element and the resin material. The niobium can and resin encased the substrate and a portion of the PCD table, leaving the front surface and the chamfered region of the PCD table exposed.

The PCD cutting element encased by the resin material and the niobium can was then leached in a 1.5 M nitric acid solution for 24 hours at a temperature of 110° C., as detailed in Example 1. Following leaching, there was no evidence of dissolution of the substrate or other damage to the substrate of the leached PCD cutting element.

Example 5

An EPOMET epoxy resin was disposed around a PCD cutting element having a tungsten carbide substrate and a chamfered PCD table. The EPOMET epoxy resin was mounted to the PCD cutting element and cured using a BUEHLER compression mounting press (Buehler, Ltd., Lake Bluff, IL) at a pressure of about 3300 psi and a temperature of 150° C. to form a cross-linked polymer layer. The polymer layer and cutting element were then cooled under elevated pressure, and the pressure was subsequently reduced to atmospheric pressure.

Following the mounting and curing process, the polymer layer was observed to be fused to both the tungsten carbide substrate and the PCD table with excellent edge retention. The polymer layer surrounded the entire tungsten carbide substrate and a portion of the PCD table adjacent to the substrate, leaving the front surface and the chamfered region of the PCD table exposed.

The PCD cutting element encased by the polymer layer was then leached in a 1.5 M nitric acid solution for 24 hours at a temperature of 110° C., as detailed in Example 1. Following leaching, there was no evidence of dissolution of the substrate or other damage to the substrate of the leached PCD cutting element.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of processing a polycrystalline diamond element, the method comprising:
    forming a protective layer over a selected portion of a polycrystalline diamond element, the polycrystalline diamond element comprising a polycrystalline diamond table comprising:
        a superabrasive face;
        a superabrasive side surface; and
        a chamfer extending between the superabrasive face and the superabrasive side surface; and
    exposing at least a portion of the polycrystalline diamond element to a leaching solution such that the leaching solution contacts an exposed surface region of the polycrystalline diamond table and at least a portion of the protective layer;
    wherein:
        a portion of the superabrasive side surface is covered by the protective layer; and
        the protective layer is not formed over the chamfer.

2. The method of claim 1, further comprising covering at least a portion of a surface of a substrate bonded to the polycrystalline diamond table with the protective layer.

3. The method of claim 1, further comprising selecting the protective layer to comprise a substantially inert material.

4. The method of claim 1, further comprising selecting the protective layer to be substantially impermeable to the leaching solution.

5. The method of claim 1, wherein forming the protective layer over the selected portion of the polycrystalline diamond element comprises exposing the protective layer to an elevated temperature of about 50° C. or higher and an elevated pressure of about 1000 psi or higher.

6. The method of claim 1, further comprising defining an intercalated hybrid layer at an interface between the protective layer and the polycrystalline diamond element.

7. The method of claim 1, further comprising selecting the protective layer to comprise at least one of a metallic material, a thermoplastic material, a glass sealant, or graphite.

8. The method of claim 1, further comprising positioning an intermediate liner between the polycrystalline diamond element and the protective layer.

9. The method of claim 8, further comprising selecting the protective layer to comprise a polymer material and the intermediate liner to comprise a metallic material.

10. The method of claim 1, further comprising leaching the polycrystalline diamond element to produce a leached volume and an unleached volume, a portion of the unleached volume defining an outer circumferential surface of the polycrystalline diamond table.

11. The method of claim 1, wherein:
    the protective layer comprises a thermosetting material; and
    forming the protective layer over the selected portion of the polycrystalline diamond element comprises curing the thermosetting material.

12. The method of claim 1, further comprising, prior to exposing at least a portion of the polycrystalline diamond element to the leaching solution:
    forming the protective layer over the selected portion of the polycrystalline diamond element; and
    partially removing the protective layer from the selected portion of the polycrystalline diamond element.

13. The method of claim 1, further comprising forming an outer layer on at least a portion of an outer surface of the protective layer.

14. The method of claim 1, further comprising covering a portion of the superabrasive side surface proximate to the chamfer with the protective layer.

15. A method of processing a polycrystalline diamond element, the method comprising:

positioning a protective layer over a selected portion of a polycrystalline diamond element, the polycrystalline diamond element comprising a polycrystalline diamond table comprising:
- a superabrasive face;
- a superabrasive side surface; and
- a chamfer extending between the superabrasive face and the superabrasive side surface;

covering a portion of the superabrasive side surface with the protective layer; and exposing at least a portion of the polycrystalline diamond element including the chamfer to a leaching solution such that the leaching solution contacts an exposed surface region of the polycrystalline diamond table.

16. The method of claim 15, wherein covering the portion of the superabrasive side surface by the protective layer comprises covering a majority of the superabrasive side surface while the chamfer remains exposed.

17. A method of processing a polycrystalline diamond element, the method comprising:

defining a protective layer over a selected portion of a polycrystalline diamond element, the polycrystalline diamond element comprising a polycrystalline diamond table including a superabrasive face, a superabrasive side surface, and a chamfer extending between the superabrasive face and the superabrasive side surface;

covering at least a portion of the superabrasive side surface with the protective layer while at least a portion of the chamfer remains exposed; and exposing at least a portion of the polycrystalline diamond element including the chamfer to a leaching solution such that the leaching solution contacts an exposed surface region of the polycrystalline diamond table.

18. The method of claim 17, further comprising positioning an intermediate liner between the polycrystalline diamond element and the protective layer.

19. The method of claim 18, further comprising selecting the protective layer to comprise a polymer material and the intermediate liner to comprise a metallic material.

20. The method of claim 19, further comprising leaching the polycrystalline diamond element to produce a leached volume and an unleached volume, a portion of the unleached volume defining an outer circumferential surface of the polycrystalline diamond table.

* * * * *